Aug. 30, 1949.  A. SIMMON ET AL  2,480,422
PRINT CONTROL INSTRUMENT FOR
PHOTOGRAPHIC ENLARGERS
Filed Nov. 21, 1947  9 Sheets-Sheet 2
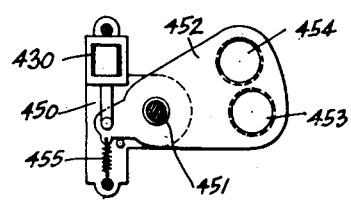
Fig: 2
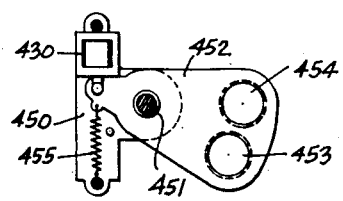
Fig: 3
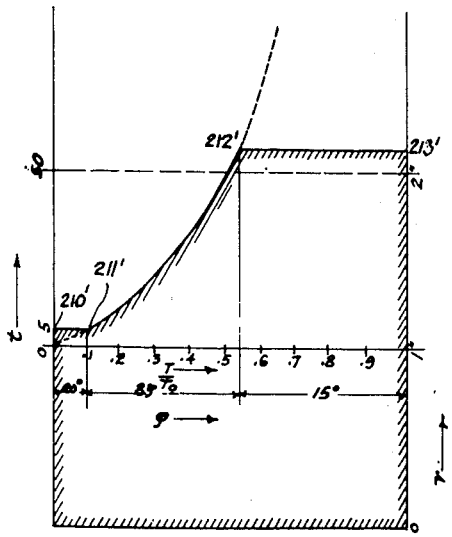
Fig: 9
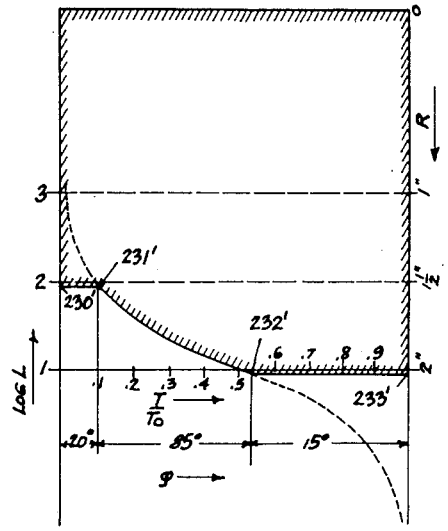
Fig: 10
INVENTORS:
Alfred Simmon
Louis L. Weisglass
BY
Walter E. Wollheim
ATTORNEY.

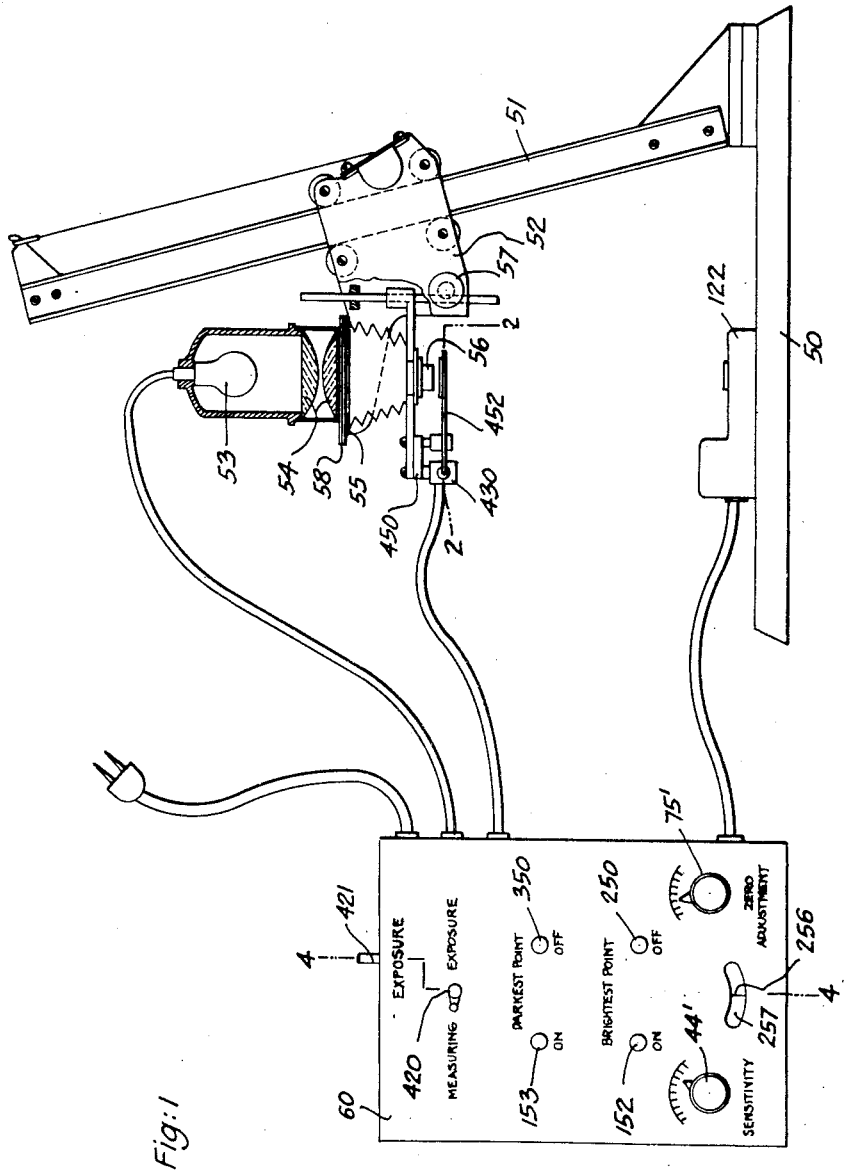

Aug. 30, 1949.  A. SIMMON ET AL  2,480,422
PRINT CONTROL INSTRUMENT FOR
PHOTOGRAPHIC ENLARGERS
Filed Nov. 21, 1947  9 Sheets-Sheet 3
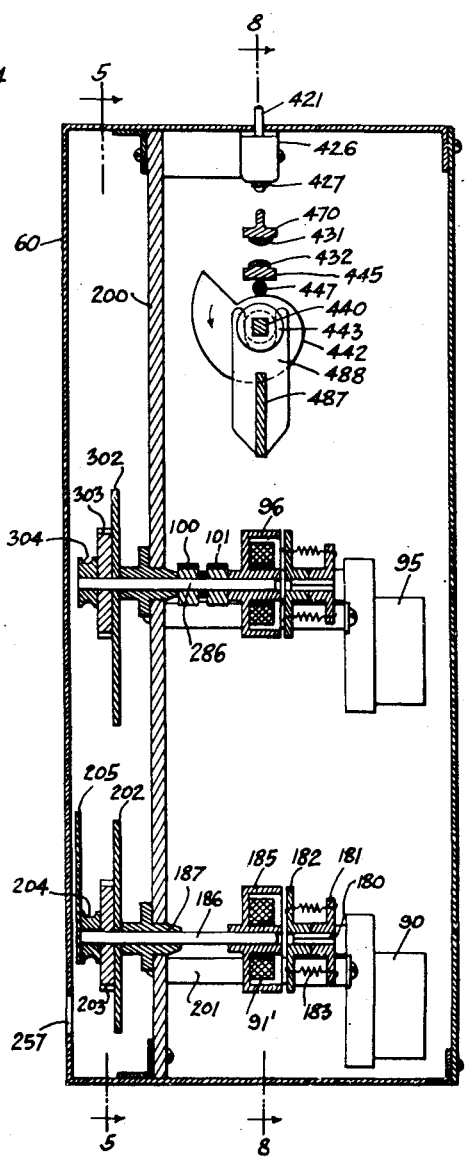
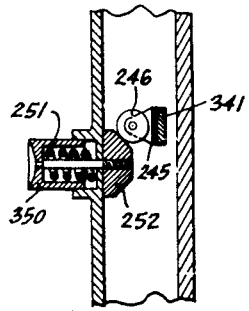
INVENTORS:
Alfred Simmon
Louis L. Weisglass
BY
Walter E. Wollheim
ATTORNEY.

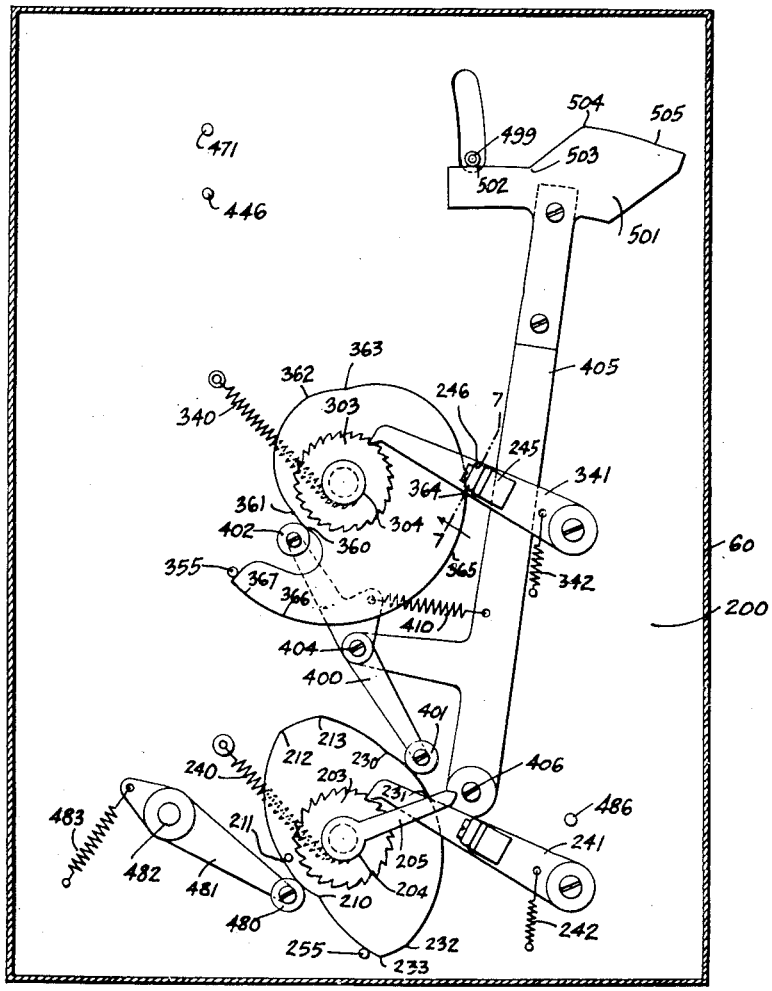
Fig: 5

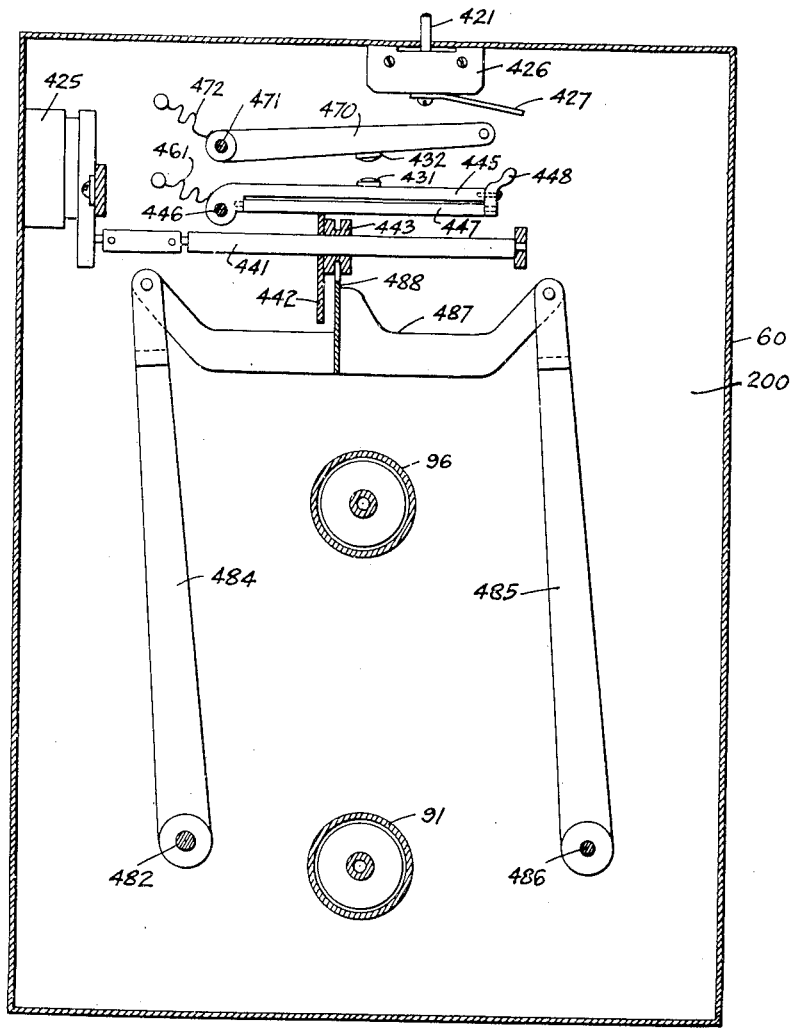

Fig: 12
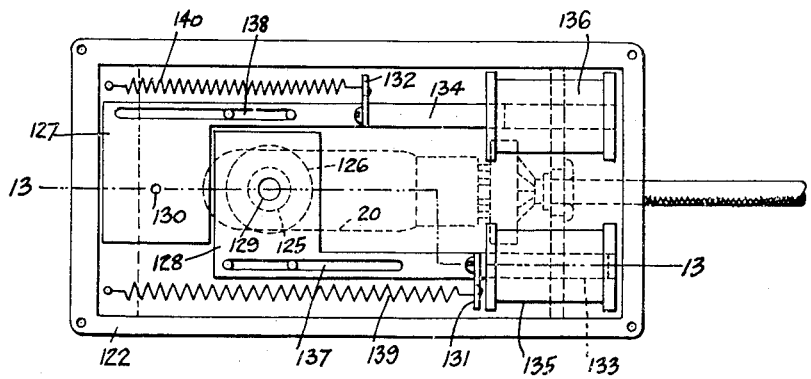
Fig: 13
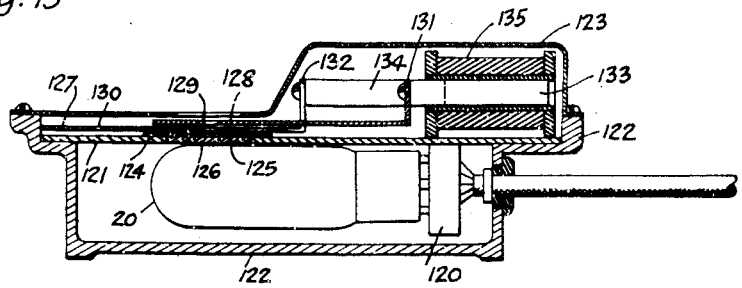

UNITED STATES PATENT OFFICE 2,480,422

PRINT CONTROL INSTRUMENT FOR PHOTOGRAPHIC ENLARGERS

Alfred Simmon, Jackson Heights, and Louis L. Weisglass, New York, N. Y., assignors to Simmon Brothers, Inc., Long Island City, N. Y., a corporation of New York Application November 21, 1947, Serial No. 787,272

24 Claims. (Cl. 88—24)

The object of this invention is an improved print control instrument for photographic enlargers. It performs successively two separate functions enabling the operator, first, to measure the intensity of the light of the brightest and of the darkest point, respectively, of the projected image formed by the enlarger and, second, making an exposure of the correct exposure time and of the correct contrast. Functionally, the device, therefore, comprises three parts, the first part adapted to measure the light intensity of the brightest and of the darkest point of the projected image, respectively, the second part comprising means to control the exposure time and means to control the contrast of the print, and the third part operatively connecting the first two parts whereby the act of measuring the aforementioned light intensities automatically adjusts a time switch and a contrast control device to their correct settings. Physically, the device comprises a relatively small housing containing a photoelectric cell which can be placed on the easel of the enlarger or, more specifically, on the brightest and darkest point of the image projected thereon, and a main unit consisting of a relatively large cabinet containing numerous electrical and mechanical components which will be described in detail below. A distinguishing feature of the device is its electrical circuit which comprises a condenser adapted to be charged or discharged by the current passing the photoelectric cell and including means to measure the time required to change the voltage of said condenser by a predetermined magnitude.

A preferred embodiment of our invention is shown in the accompanying drawings in which Fig. 1 is an elevational view of a typical enlarger equipped with a print control device built according to this invention;

Fig. 2 is a sectional view along the plane of line 2—2 in Fig. 1 showing an electro-magnetically controlled color filter placed for contrast control purposes in the path of the light emanating from the enlarger and with its solenoid in a deenergized position;

Fig. 3 is a sectional view similar to Fig. 2 but with the solenoid in an energized position;

Fig. 4 is a sectional view along the plane of line 4—4 in Fig. 1;

Fig. 5 is a sectional view along the plane of line 5—5 in Fig. 4 showing elements of the main unit before the beginning of the light measuring process;

Fig. 7 is a fragmentary sectional view along the plane of line 7—7 in Fig. 5 showing details of a resetting device;

Fig. 8 is a sectional view along the plane of line 8—8 in Fig. 4.

Fig. 9 is a graph illustrating the mathematical relation of exposure time and condenser charging time of the first time measuring unit for the brightest point on the easel, the design of a cam adjusting the setting of the time switch in accordance with the light intensity of the brightest point being based on this graph;

Fig. 10 is a graph showing the relation between the logarithmic light intensity of the brightest point and the condenser charging time of the first time measuring unit;

Figure 11:
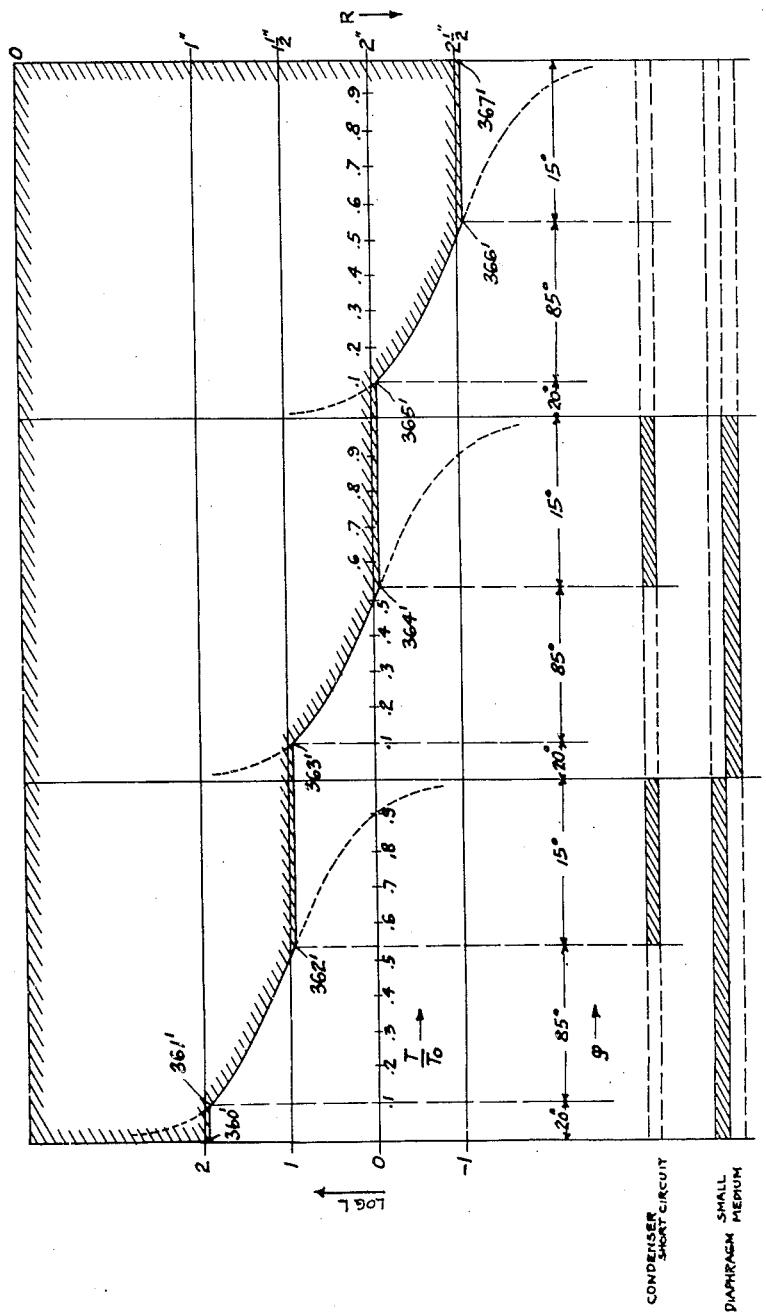

Fig. 11 is a graph showing the relation between the logarithmic light intensity of the darkest point and of the condenser charging time measured by the second light measuring unit, Figs. 10 and 11 forming the basis for two cams associated, respectively, with the devices measuring the charging time of the condenser when the light intensity of the lightest and darkest points on the easel is measured, these two measurement then by means of a suitable mechanism being utilized to adjust the contrast control device to its proper setting for a subsequent exposure;

Fig. 12 is a plan view, with the cover removed, of the photo cell housing which can be placed on the easel;

Fig. 13 is a sectional view along the plane of line 13—13 in Fig. 12; and

Figure 14:
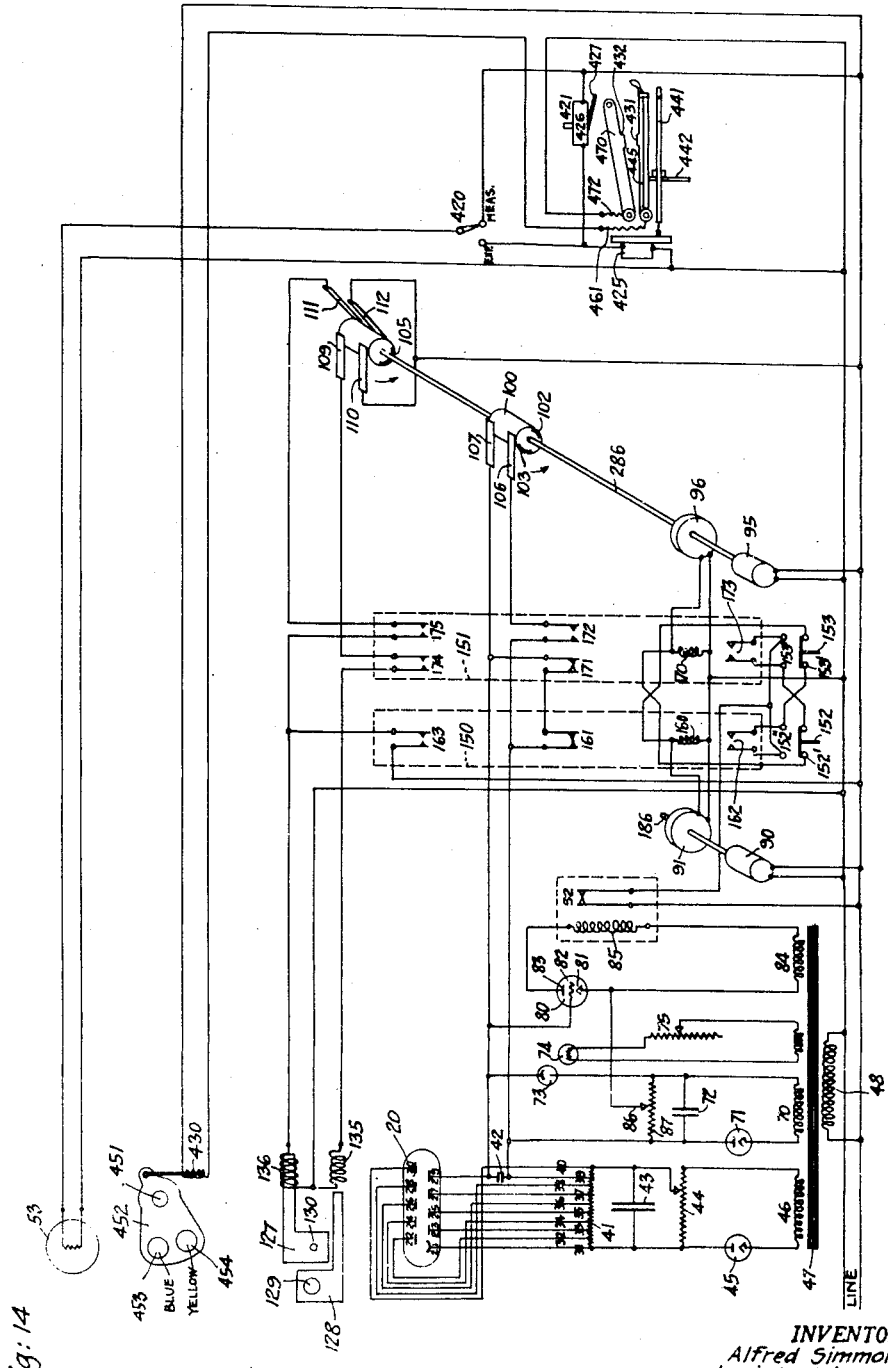

Fig. 14 is a wiring diagram of the device.

Like characters of reference denote similar parts throughout the several views and the following specification.

Basic electrical design

While numerous ways are known at the present time to measure light intensities, the choice for the present purpose is limited because the illumination on the easel of the photographic enlarger can, and often does, assume exceedingly low values. For this reason, we use a photoelectric cell of the so called electron multiplier type since complex amplifiers are not necessary with this cell in order to obtain high light sensitivity. The circuit associated with this cell, due to the very low light intensity to be measured, represents an additional problem.

It is known that it is expedient for this purpose to use a condenser in series with the photoelectric cell and to measure the time it takes to charge or discharge this condenser. While it is theoretically unimportant whether the condenser is charged or discharged during this process, more convenient circuit relations can be obtained by having the condenser charged and this has been shown in the following example. The current that passes the photoelectric cell is substantially proportional to the intensity of the incident light. The charging or discharge time of the condenser, however, is inversely proportional to the current with which it is charged or discharged, and consequently for a circuit of this type charging or discharge times of the condenser for zero light intensity becomes infinite, and for low light intensities these times become very long. This is objectionable for a number of reasons, for example, with very long charging or discharging times incidental small leakages may falsify the result completely. In order to overcome this condition, we provide two parallel but otherwise independent charging circuits for the condenser. The current passing the first circuit is controlled by the photoelectric cell and is at least substantially proportional to the light intensity to be measured. The current passing the second circuit is constant and entirely independent of the light intensity but may, of course, for convenience, be adjusted to a suitable value where it will be left during the operation of the device. The result of this arrangement is that for zero light value, i. e., absolute darkness, a definite condenser charging time is obtained and that by this expedient convenient and efficient circuit conditions can be easily arranged.

For reasons which will become apparent later, it is important to express the relation between light intensity and condenser charging time for a circuit of the above description. If we call $C$ = Condenser capacity.
$T$ = Condenser charging time.
$E$ = Condenser voltage.
$i_1$ = Condenser charging current through multiplier tube in $\mu$ a. (micro-amps.).
$K$ = Multiplier sensitivity in $\mu$ a./foot candles.
$L$ = Light intensity in foot candles (on easel surface).
$i_2$ = Condenser charging current through auxiliary circuit (in $\mu$ a.).

And if we assume that the condenser is charged from a zero voltage, the condenser voltage $E$ can be expressed as follows:

$$E = \frac{T}{C}(i_1 + i_2)$$

$$= \frac{i_2 T}{C}\left(\frac{i_1}{i_2} + 1\right)$$

or $$T = \frac{CE}{i_2}\left(\frac{1}{\frac{i_1}{i_2} + 1}\right)$$

For $i_1 = 0$, i. e., without any light reaching the photoelectric cell, we shall call the condenser charging time $T_0$. This time becomes $$T_0 = \frac{CE}{i_2}$$

This can be introduced into the formula for $T$:

$$T = T_0\left(\frac{1}{\frac{i_1}{i_2} + 1}\right)$$

or $$\frac{i_1}{i_2} = \frac{1}{\frac{T}{T_0}} - 1$$

For $i_1$ we can substitute $KL$, and obtain $$\frac{KL}{i_2} = \frac{1}{\frac{T}{T_0}} - 1$$

$$L = \frac{i_2}{K}\left(\frac{1}{\frac{T}{T_0}} - 1\right)$$

As will be seen later, based on this relationship, cams of very convenient configuration can be designed by means of which exposure times as well as logarithmic light intensity values can be obtained. The convenience with which this can be done is based on the peculiar characteristics of the double condenser charging circuit as expressed by the above formula and this is one of the principal advantages of this arrangement.

Basic mechanical design

As can be seen in Fig. 1, the unit consists, in addition to the enlarger which is merely shown in the interest of completeness, of two principal units, the photocell unit and the main unit.

Enlarger

The enlarger may be of any convenient form or design and merely as a matter of example we have shown a more or less conventional type which may be used for this purpose. This enlarger comprises a base or easel 50 on which a supporting structure 51 is mounted. During the actual printing exposure a sheet of sensitized paper is placed on this easel. The supporting structure may be vertical or, preferably, slightly inclined as shown. Slidably arranged on this supporting structure is a carriage 52 supporting the projector. The main parts of this projector are a lamp 53, a condenser 54, a film stage 55, a lens 56 and a focusing movement 57. A negative 58 can be placed on the film stage. The distance of the lens 56 from the negative 58 can be adjusted in the usual manner by means of the focusing movement 57 which may, for example, comprise a rack and pinion movement operated by a small handwheel.

Photocell unit

Referring to Figs. 12 and 13, a photoelectric cell 20 is mounted in a conventional tube socket 120 attached to a plate 121. This plate is mounted in a housing 122, the upper part of which is closed by a cover 123, cover 123 having been omitted in Fig. 12. Plate 121 supports directly above the photoelectric cell a thin plate 124 with a relatively large aperture 125. Between this aperture and the photoelectric cell there is a small disc of diffusing glass 126. It is the purpose of this diffusing glass to prevent irregularities due to the fact that without it the light impinging upon the light sensitive elements of the photoelectric cell 20 may hit more or less sensitive spots therein. By interposing this diffusing glass the entire area of this light sensitive cell will be evenly illuminated.

Mounted on top of plate 121 are two electromagnetically controlled diaphragms 127 and 128. Diaphragm 128 has a medium sized aperture 129 which is smaller than the aforementioned large aperture 125. In the example described here the area of aperture 129 is $\frac{1}{10}$ of the area of aperture 125. The diaphragm 127 has an aperture 130 which is still smaller and which in the same example has 1/10 of the area of aperture 120 or 1/100 of the area of aperture 125. Each of these diaphragms has the shape shown in Fig. 12, and the two diaphragms are arranged in slightly different planes as shown in Fig. 13. Each of these plates has an upturned lug 131 and 132, respectively, and to each of these upturned lugs there is attached an iron core 133 and 134. Two electromagnetic coils 135 and 136 are provided which, when energized, attract one of these iron cores, respectively. As shown in Fig. 12, coil 135 is represented as energized and has thereby attracted iron core 133 which, in turn, places diaphragm 128 in a position in which its aperture 129 is directly above the photo sensitive elements of the photoelectric cell. In the circuit diaphragm, Fig. 14, coil 136 is shown as energized. Each of the aperture plates has a slot 137 and 138, respectively, and each of these slots engages two guide pins as shown in Fig. 12. Return springs 139 and 140 are provided for returning the diaphragm blades to their original positions as soon as the corresponding coil is deenergized.

Main unit

The main unit is shown in Fig. 1 and comprises a housing 60. preferably of rectangular shape containing all elements other than the photocell unit just described. These elements comprise the mechanisms to be described later by means of which the measured condenser charging times will be converted into exposure time and contrast settings, and also numerous electrical components such as a transformer, rectifying tubes, thyratrons, condensers, relays and others. The precise location of these parts within the housing is of no consequence and they have, therefore, not been shown except on the wiring diagram of Fig. 14. Their electrical function, however, will be fully explained in the following paragraphs.

On the front panel of the main unit the following elements are visible:

1. A handwheel 44' by means of which the sensitivity of the photocell can be adjusted in accordance with the sensitivity of the sensitized paper which will be used for the print.
2. A handwheel 75' for the zero adjustment by means of which any accidental leakage within the device can be compensated for. This zero adjustment cooperates with a pointer which will appear in a window 257 and which should come to rest on a vertical line 256.
3. A push button 152 by means of which the measuring process for the brightest point on the easel can be initiated.
4. A push button 250 by means of which the device can be reset after this measuring process.
5. A push button 153 by means of which the measuring process for the darkest point on the easel can be initiated.
6. A push button 350 by means of which the device can be reset after this process.
7. A two way switch 420 with two respective positions called "measuring" and "exposure."
8. A push button 421 by means of which the time switch can be started.

Electrical circuit

The electrical circuit is shown in Fig. 14. For convenience, it can be sub-divided into seven parts as follows:

1. Supply circuit for multiplier tube and first condenser charging circuit.
2. Second condenser charging circuit.
3. Thyratron circuit.
4. First time measuring unit.
5. Second time measuring unit.
6. Push button and relay circuit.
7. Time switch and contrast control device.

These circuits will be described in this sequence.

Supply circuit for multiplier tube and first condenser charging circuit

The photoelectric cell or multiplier tube 20 comprises a vacuated vessel, a photoemissive cathode 21, and nine electrodes 22 to 30. The cathode 21 and the electrodes 22 to 30 are connected to corresponding taps numbered 31 to 40 of a voltage divider 41. A condenser 42 is inserted into the second last of these connections, i. e., between points 39 and 29. The voltage divider is placed across the terminals of another condenser 43 which, in turn, receives its voltage from a potentiometer 44. This potentiometer is supplied with rectified current by means of a rectifying tube 45 and a transformer which has a secondary coil 46, an iron core 47 and a primary coil 48. The primary coil, in turn, is connected to an alternating current line.

As can be seen, the secondary coil 46 delivers an alternating current of a suitable voltage which, by means of rectifying tube 45 is rectified and impressed upon potentiometer 44. Depending upon the adjustment of this potentiometer, a certain portion of this rectified voltage reaches the condenser 43 which acts as a filter and converts the rectified uni-directional alternating current into direct current with only a small ripple. This D. C. voltage is then by means of voltage divider 41 divided into ten parts. Point 31 assumes the most negative potential and is connected to the photoemissive anode of the multiplier. Going from left to right, subsequent points of the voltage divider 41 become increasingly positive and each point has a positive voltage with respect to its left neighbor of approximately 100 volts. The last point 40 which is connected to the last electrode 30 of the multiplier tube is, of course, the most positive of all.

As a result of this arrangement, the few electrons which are released by the action of light from the cathode 21 are attracted to the next electrode 22 where they strike with sufficient velocity to release a number of secondary electrons. The secondary electrons are, in turn, attracted by the next electrode 23 where they release tertiary electrons, and this process is repeated at each subsequent electrode. The number of the secondary electrons released at electrode 22 is larger than the number of primary electrons causing their release, and again the number of tertiary electrons released at 23 is larger than the number of secondary electrons, and the ability of the tube to "multiply" electrons is based on this fact. The current circulating in the last loop, i. e., between points 40 and 30 which charges condenser 42 becomes, therefore, comparatively heavy.

The light sensitivity of the tube depends upon the voltage imposed upon adjacent electrodes and, therefore, potentiometer 44, by means of which this voltage can be adjusted, provides a convenient means to adjust the sensitivity of the tube. This potentiometer can be actuated by means of a handwheel 44' shown in Fig. 1 and by means of which the sensitivity of the device can be adjusted to match the sensitivity of the sensitized paper on which subsequently a print is to be made.

The sensitivity of the device can also be adjusted by changing the size of the light admitting aperture and two electro-magnetically controlled diaphragm blades 127 and 128 serving this purpose were already referred to in connection with Figs. 12 and 13. They are again shown above the multiplier tube 20 in Fig. 14.

It can be seen that current circulating in the last loop between points 39 and 40, and 30 and 29, causes condenser 42 to be charged. Condenser 42 is, by means to be shown later, short circuited before the measuring process begins, and the time required to charge it to predetermined voltage constitutes a measure of the light impinging upon the multiplier tube 20.

Second condenser charging circuit

The second condenser charging circuit is connected across the terminals of condenser 42 in parallel to the first charging circuit. Distinguished from the first charging circuit, however, the current within this second circuit is constant and entirely independent of the light impinging upon the photoelectric multiplier tube 20. The second circuit, therefore, comprises a second source of D. C. voltage and an element which keeps the current in the second charging circuit constant regardless of the voltage to which condenser 42 happens to be charged at any given instant.

The source of D. C. may be of any desired type and could, for example, be a battery. For convenience, however, we have chosen a transformer with a secondary coil 70, a rectifying tube 71 and a condenser 72. The secondary coil 70 could, of course, be associated with its own core and its own primary coil, but it can also, and this is preferable, be mounted on the same iron core 47 which was already provided for the transformer which supplies current for the first charging circuit.

(The current limiting device which keeps the current within the second charging current constant may be of one of several known types. For example, a screen grid tube has the property to keep the plate current constant within wide limits of plate voltages. We prefer to use as a current limiting element a second photoelectric cell 73 which is, in turn, illuminated by a small incandescent lamp 74 in series with a small rheostat 75. It must be emphasized that the second photoelectric cell 73 has no connection with the photoelectric multiplier tube 20 and is not exposed to the light emanating from the enlarger. This second photocell 73 is merely a convenient means of keeping the current within the second charging circuit constant.

The current circulating within the second charging circuit can be conveniently adjusted by changing the illumination of photocell 73 through manipulation of rheostat 75 which regulates the current passing incandescent lamp 74. Rheostat 75 can be adjusted from the front of the housing 70 of the main unit by means of handwheel 75'.

Circuits of this type are quite sensitive to accidental leakages and even the most perfect means of insulation cannot completely eliminate any leakage. It is, furthermore, virtually impossible to keep this leakage at a constant value and it may change from day to day, depending, for example, upon temperature and humidity conditions. It is, therefore, a particular advantage of the double charging circuit as described here, that the leakage can be easily compensated for. This can be done by covering the photoelectric multiplier tube 20 so that no light from the enlarger or any other source can reach it. In other words, the first charging circuit will then be currentless except for any accidental leakage. The condenser 42 is then charged by the second charging circuit alone. The time required to charge condenser 42 by the second charging circuit alone to a predetermined voltage can then be measured and, if this time differs from a standard, it can be adjusted by moving rheostat 75 in one direction or the other. If, for example, the leakage within the two condenser charging circuits has increased since the last adjustment, the charging time of condenser 42 by the second charging circuit alone will usually be longer than the standard time, and in order to restore the former conditions, the charging current within the second charging circuit must be increased. This can be done by reducing the resistance of rheostat 75 so that lamp 74 becomes brighter and consequently, photocell 73 passes more current. An adjustment in the opposite direction, if desired, can, of course, be made in a corresponding manner.

Thyratron circuit

The purpose of this circuit is to provide means to indicate when the voltage of condenser 42 has reached a predetermined critical value. It consists of a thyratron tube 80, with a cathode 81, a grid 82 and an anode 83. The thyratron is energized by alternating current derived from a secondary coil 84 preferably, but not necessarily, mounted on the same iron core 47 as the two other secondaries 46 and 70 described above. The plate circuit of the thyratron is completed by a relay coil 85 actuating a normally closed contact 92 to be described later. The grid of the thyratron is connected to the positive terminal of the condenser 42 and, to complete the grid circuit, the cathode 81 is connected to a sliding contact 86 of a resistance 87 connected across the terminal of condenser 72. It can be seen that the voltage of the thyratron grid 82 with respect to the cathode 80 consists of the voltage impressed upon the left part of resistance 87 and of the voltage impressed upon condenser 42. The two voltages are of opposite polarity. A thyratron is usually non-conductive as long as its grid voltage with respect to the cathode is more negative than —2 volts, and it becomes current conducting as soon as the grid voltage is less than —2 volts negative with respect to the cathode. The result of this arrangement is that as soon as the condenser voltage is less than 2 volts smaller than the voltage of the left half of resistance 87, the previously non-current conducting thyratron becomes current conducting, whereupon current begins to flow in relay coil 85.

First time measuring unit

The two time measuring units are of identical design and comprise each a constant speed motor with an output shaft and including means to cause this output shaft to remain stationary before and after the time measuring process, but to rotate during the time measuring process. The motor itself may rotate permanently or may rotate during the charging period only. Various means are conceivable to connect this motor to its output shaft for the required time. For example, small clockwork motors are available equipped with an electro-magnetic gear shift which causes the output shaft to be connected to the motor when the motor is energized and to be disconnected therefrom when the motor is de-energized, or a permanently rotating motor may be equipped with an electromagnetic clutch. In this particular example, the latter design has been chosen, i. e., the motor rotates permanently, but the output shaft is ordinarily stationary and rotates only when the clutch is energized. This takes place during the time required to charge condenser 42 and, consequently, the angle of rotation traveled by the output shaft is proportional to the charging time, and therefore, a function of the light impinging upon the electron multiplier tube 20.

The first charging circuit comprises a motor 90 which is preferably of the synchronous type used for clockwork movements or the like. The electro-magnetic clutch 91 is shown schematically in the diagram, but the actual physical appearance of the clutch is shown in Fig. 4 and will be described later. One side of the clutch is directly connected to one leg of the line, and the other side is connected across the two push button contacts to be described later and the normally closed contact 92 which is actuated by relay coil 85 which was already described above and which is the load element of the thyratron circuit.

*Second time measuring circuit*

The second time measuring circuit is identical to the first time measuring circuit except that two rotating switch elements are mounted on the output shaft. A constant speed motor 95 is again connected to the line and an electromagnetic clutch 96 is connected in the same manner as the corresponding clutch 91 of the first time measuring circuit, i. e., one side of the clutch 96 is directly connected to one leg of the line, and the other side is connected across the two push buttons and the relay contact 92.

Mounted on the output shaft are two rotating switches, the first of which short circuits condenser 42 at suitable intervals, and the second of which actuates one or the other of the solenoids 135 and 136 which control the two diaphragm blades 128 and 127, respectively. Both switches comprise cylinders 100 and 101, respectively, which are made from insulating material, but carry two strips 102 and 103 in the case of cylinder 100, and one strip 105 in the case of cylinder 101 made from brass or some other current conducting material.

Sliding on cylinder 100 are elastic spring contacts 106 and 107. It will be clear that when cylinder 100 rotates, strips 102 and 103 will, at certain times, conductively connect these spring contacts 106 and 107 and thereby short circuit condenser 42 at certain times. The spring contacts 106 and 107 are in series with a normally open relay contact 172, the function of which will be explained later.

In like manner two pairs of spring contacts 109, 110 and 111, 112 slide on cylinder 101, and a metallic strip 105 which is attached to cylinder 101 will, therefore, at certain times conductively connect 109 to 110 or 111 to 112. The contact pair 109 and 110 is in series with a normally open relay contact 174 and controls solenoid 135 which attracts, when energized, diaphragm blade 128. In like manner contact pair 111, 112 is in series with normally open relay contact 175 and controls solenoid 136 which, when energized, attracts diaphragm blade 127.

*Push button and relay circuit*

In order to make the operation of the device convenient for the operator and fool-proof, the entire circuit is controlled by two relays 150 and 151 and two push buttons 152 and 153. The push buttons are physically mounted on the front panel of the main unit and can be seen in Fig. 1.

Each push button has, respectively, a normally closed contact 152' and 153' and a normally open contact 152'' and 153''. Relay 150 comprises an armature or coil 160, a normally closed contact 161 and two normally open contacts 162 and 163. Relay 151 comprises a coil 170, a normally closed contact 171 and four normally open contacts 172, 173, 174 and 175.

The normally open contact 152'' of push button 152 is in series with a normally closed contact 153' of contact 153. In like manner the normally open contact 153'' of push button 153 is in series with the normally closed contact 152' of push button 152. This arrangement is a safeguard against the possibility of an ignorant operator depressing both push buttons at the same time. As it is, both push button circuits in this case would be dead.

The normally open contact 162 of relay 150 is connected in parallel to the normally open push button contact 152''. Likewise the normally open contact 173 of relay 151 is connected in parallel to the normally open contact 153'' of push button 153. In other words, contacts 162 and 173 serve as "hold in" contacts, and a momentary depression of push buttons 152 and 153, respectively, will energize relay coils 160 and 170 and, in turn, close all the normally open contacts of the respective relays, among them 162 and 173. Since these contacts are connected in parallel to the corresponding normally open push button contacts 152'' and 153'', the relay coils will remain energized even after the operator releases the push buttons, and this condition will persist until the circuits will be opened at some other place, as will be described later.

The normally closed contacts 161 and 171 are in series with each other and connected across the terminals of condenser 42. This condenser is thereby short circuited unless one of the relays is energized, i. e., before the start of the measuring process. Normally open contact 172 is in series with the spring contacts 106 and 107 sliding on the rotating switch element 100 mounted on the output shaft of the second time measuring unit and described above. As a consequence of this arrangement, the rotating switch element 100 can short circuit condenser 42 only when relay 151 is energized.

Normally open contact 163 energizes, when closed, solenoid 136 which attracts diaphragm blade 127 carrying the smallest diaphragm opening for the photoelectric multiplier tube 20. The consequence of this arrangement is that as soon as relay 150 is energized, i. e., during the measuring process for the brightest point on the easel, the smallest diaphragm aperture 130 contained in blade 127 is placed in front of the photoelectric multiplier cell 20, and thereby the measuring process for the brightest point on the easel is always performed with the smallest light acceptance or light sensitivity of the photocell.

Normally open contacts 174 and 175 are, respectively, in series with one of the two pairs of spring contacts 109, 110 or 111, 112. Due to this arrangement, rotation of switch element 101 mounted on the output shaft of motor 95 of the second time measuring unit energizes either solenoid 136 or solenoid 135 or neither. This means that for approximately the first third of a revolution of the output shaft of the second time measuring unit, the light acceptance of the electron multiplier tube will be governed by the diameter of the smallest aperture 130 in diaphragm blade 127, that for approximately the second third of the revolution, the light acceptance of the cell will be governed by the medium sized aperture 129 in diaphragm blade 128, and for the last third of the revolution, this light acceptance will be governed by the large aperture 125 which is fixedly built into the top wall of the housing of the electron multiplier tube, see Fig. 13. In the interest of simplicity, no means have been shown to energize the filaments of the two rectifying tubes 45 and 71 and of the thyratron 80. These means may, for example, be batteries or filament transformers or, preferably, a few turns of wire may, for each tube, be wound on the core 47 of the transformer which already exists.

*Circuit of time switch and contrast control device*

The timer comprises a motor 425 which is preferably a small synchronous motor of the type used in clockworks or the like. These motors are commercially available with a built-in gear reduction of a suitable ratio and with an electromagnetic gear shift by means of which the output shaft is automatically connected to the motor when the motor is energized and disconnected therefrom when the motor is deenergized. This motor drives a mechanism which will be described later and which after a certain length of time actuates a switch 426 which has on its lower face a leaf spring 427 and on its upper face a push button 421 shown in Fig. 1. This switch is normally closed and is of the maintained contact type, i. e., when leaf spring 427 is depressed, the switch opens and remains open even after the pressure on leaf spring 427 ceases. The closed condition can be restored by actuating push button 421. This switch is in series with motor 425 which ordinarily remains currentless since switch 426 is usually open as a result of a previous exposure. When the operator depresses push button 421 this switch becomes closed and remains closed until the mechanism driven by motor 425 actuates leaf spring 427, thereby opening the switch again. In the "exposure" position of switch 420 the lamp 53 of the enlarger is controlled simultaneously with the motor. Switch 420, also shown in Fig. 1, is interposed into the lamp line. This switch has two positions marked "exposure" and "measuring," respectively. It can be seen that in the "exposure" position the lamp is in parallel with motor 425, but that in the "measuring" position the lamp supply line by-passes the motor and that the lamp is then connected permanently to the supply circuit.

The mechanical design of the contrast control device will be explained below. The electrical circuit comprises a solenoid 430 connected across the line in series with a switch which comprises two contacts 431 and 432. These contacts are actuated by the timer mechanism in a way to be described later and cause solenoid 430 to receive current sooner or later during the time cycle of an exposure.

*Mechanical design of first time measuring unit*

Figure 6:
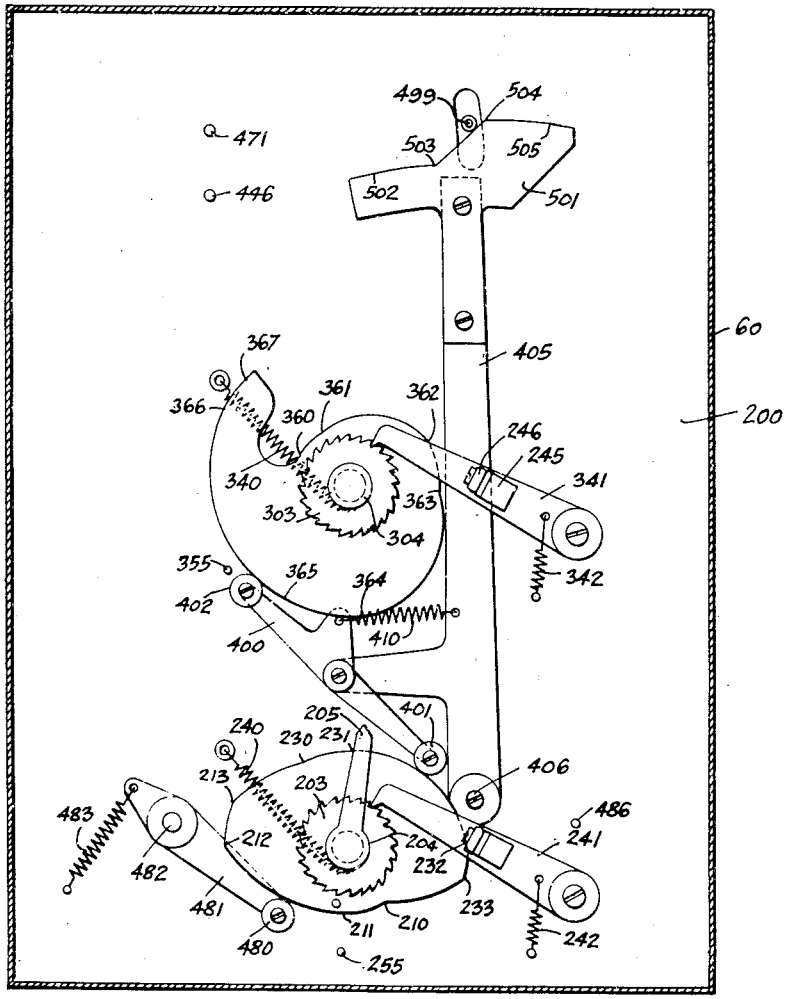
Fig. 6 is a sectional view similar to Fig. 5 but with the elements shown after the termination of the light measuring process.

The actual physical appearance of the two time measuring units is illustrated in Figs. 4, 5 and 6.

The first time measuring unit is the lower one and measures the time required to charge the condenser 42 to a predetermined voltage when photocell 20 is placed on the point of brightest illumination on the easel.

It comprises a constant speed motor 90 which is, preferably, a synchronous motor of the type used for small clock movements or the like. These motors are commercially available with a built-in gear reduction so that a shaft 180 of this motor has only a slow speed, for example, a speed of 2 R. P. M. would be quite suitable. The front end of the shaft is of square or similar cross-section and two discs are carried by this shaft. A first disc 181 is fixedly fastened to this shaft whereas a second disc 182 which is made from iron is free to slide axially by a small distance. Two springs 183 tend to retract disc 182 as much as possible. A clutch coil 91' is, preferably, surrounded by a cylindrical body of soft iron 185 fastened to an output shaft 186. The coil 91' and the cylindrical body 185 form an electro-magnet which, when energized, attracts iron disc 182, thereby causing the entire clutch body and the output shaft 186 to rotate. Current is supplied to coil 91 by means of two flexible cables, which is possible because the clutch and the output shaft never perform more than one revolution. These flexible cables, however, are not shown in the drawing.

The motor 90 is fastened to a baseplate 200 by means of two studs 201 and the output shaft 186 is supported in a bearing 187. The front of the output shaft 186 carries a cam element 202, a ratchet gear 203, and a pulley 204. The purpose and coaction of these last two elements is as follows:

Since, during operation of the device, i. e., during the measuring process, the output shaft 186 with all the elements connected thereto moves from the zero position into some position indicative of the measured light value, it becomes necessary to provide means to keep these elements in the extreme position which they occupy after the light measuring process has been terminated by action of thyratron 80 and the relays controlled thereby. Likewise means must be provided to return all these parts to their original starting position at the option of the operator before a new measuring process can be started. Referring to Fig. 5 a ratchet gear 203 and a pulley 204 are fastened to the output shaft 186 of the first time measuring unit. Attached to pulley 204 is a spring 240 which biases all elements attached to shaft 186 in a clockwise direction. Co-operating with ratchet gear 203 is a ratchet 241 which is under the influence of a spring 242 and which prevents thereby ratchet gear 203 from returning to its starting position in a clockwise direction, which it is urged to do by the tension of spring 240.

Fastened to ratchet 241 is a small bracket 245 carrying a roller 246. A push button 250 is mounted on the front panel of the main unit which is pressed rearwardly by a spring 251 and which carries a tapered part 252. This tapered part is in contact with roller 246, see Fig. 7.

During the charging time of the condenser the clutch is energized and, therefore, shaft 186 with ratchet gear 203 rotates in a counterclockwise direction. As soon as condenser 42 has reached a predetermined voltage, the clutch is deenergized and, therefore, shaft 186 ceases to rotate. Spring 240 urges the shaft and the elements connected with it to return in a clockwise direction into their starting position, but as long as ratchet 241 is in operative engagement with ratchet gear 203 this is rendered impossible. In other words, the ratchet gear 203 is arrested in its extreme counter-clockwise position.

When the operator choses to reset the first time measuring device because the indicated measurement is no longer wanted, or because another measurement is desired, he depresses push button 250. Push button 250 with the associated tapered part 252, Fig. 7, moves from left to right, causing roller 246 to perform a corresponding vertical movement. This, in turn, causes ratchet 241 to swivel slightly around its supporting pivot, bringing its tip out of engagement with ratchet wheel 203, whereupon the pull of spring 240 can exert itself and return the ratchet wheel 203 with the cam 202 and shaft 186 into its starting position. This starting position is determined by a pin 255 mounted on a baseplate 200.

A pointer 205 is carried on the extreme front end of shaft 186. This pointer is used to determine the proper leakage conditions of the device. The operation of this leakage indicator will be described later.

*Mechanical design of second time measuring unit*

The design of this unit is in many respects identical with the design of the corresponding first unit. It comprises a constant speed motor 95, a clutch 96 and an output shaft 286. Mounted on this output shaft is a cam 302, a ratchet gear 303 and a pulley 304, see Fig. 4. Fastened to pulley 304 is a spring 340 which biases the entire output shaft assembly in a clockwise direction. Cooperating with ratchet gear 303 is a ratchet 341 associated with a push button controlled resetting device in precisely the same manner as in the first time measuring unit. The corresponding push button 350 can be seen in Fig. 1.

The second time measuring unit differs from the first time measuring unit in two respects: Two rotating switch elements 100 and 101 are mounted on an output shaft 286, and a different cam is provided.

The two rotating switch elements 100 and 101 cooperate with spring contacts shown in Fig. 14. The electrical function of this arrangement has already been explained.

The purpose of the second time measuring unit is to give an indication of the logarithmic light intensity value of the darkest point measured on the easel. This is in some respects more difficult than the corresponding indication of logarithmic light intensity value for the brightest point on the easel because here the range could be limited to a ratio of 1:10. In view of the fact that the operator can adjust the light output of the enlarger by means of the diaphragm or by other means within fairly wide limits, this limitation appears reasonable, but a similar limitation cannot be imposed upon the range in which the darkest point may fall. The reason for this is obvious. Not only may the light intensity of the brightest point vary in the proportion of 1:10, but the contrast of the negative itself may vary within the range of approximately 1:100. These two ranges together determine the expected range of the light intensity for the darkest point which may, therefore, be of the general order of 1:1000. In order to accommodate this exceedingly wide range the following means are employed:

The second time measuring unit is made to run through an operating cycle substantially identical to the operating cycle of the first time measuring unit, but not once but three times. Between these operating cycles the condenser is automatically discharged since it is short circuited by the action of switch element 100, see Fig. 14, which is mounted on the output shaft 286. During the first operating cycle the smallest aperture 130 is placed in front of the photoelectric multiplier tube 20. During the second operating cycle the next larger diaphragm opening 120 is in this position, and for the third operating cycle the light admittance of the cell is controlled by the aperture 125 which is still larger and which is in the top wall of the photo cell housing 121. This change of apertures is effected by the action of the switch element 101 energizing, during the first cycle, solenoid 130, which energizes solenoid 135 during the second cycle, and which renders both solenoids currentless during the third cycle. As a result of this change of aperture, the light sensitivity of the device is systematically increased from cycle to cycle, and if condenser 42 fails to reach the predetermined voltage at which it actuates thyratron 80 and stops motor 95 during the first cycle, because, due to the small aperture, the photocell current is too small, it may do so during the following or the next following cycle, when the photocell current, due to the larger aperture, is correspondingly higher.

It is understood that in reality the second time measuring unit will run through all three cycles only if the negative to be measured is of rather extreme contrast. For ordinary negatives, motor 95 will come to a standstill much earlier, usually during the second cycle, and in the case of very flat negatives, motor 95 may even stop during the first operating cycle.

*Mechanical design of time switch*

The time switch may be of any of the many existing designs. The one described below is preferred merely because it can easily be combined with the contrast control device to be described later.

While the most frequently used type of time switch utilizes an element traveling with constant speed and includes means to adjust the length of travel of said element, the reverse principle is used here, i. e., the moving element of the time switch always travels a constant distance regardless of the time adjustment, but means are provided to change the speed of its travel. More specifically, a pivoted lever is used which rotates by a relatively small but constant angle and means are provided to adjust the speed of this rotation. A longitudinal cross-sectional view through the time switch is shown in Fig. 8 and a transverse cross-sectional view in Fig. 4. The time switch comprises a motor 425 which, as already explained, is preferably of the synchronous type used for clockworks and which includes an electro-magnetic gear shift and a gear reduction. This motor is fastened to the baseplate 200 by means of a bracket 440, and drives a shaft 441 which is of square or similar cross-section. A cam 442, fastened to a hub 443, rides on this shaft. The cam is spiral shaped as can be observed in Fig. 4, i. e., in a system of polar coordinates the radius increases in straight proportion with the angle. For reasons which will be explained later, the cam is preferably made from insulating material. Due to the configuration of shaft 441 and of the corresponding hole in hub 443, cam 442 is forced to rotate with shaft 441 but is free to slide on it axially. Its axial position is determined by a mechanism which will be described later.

Mounted above the shaft and cam assembly just described is a pivoted lever 445 which is supported by a pivot 446 and which lever carries a long roller 447 and at its extreme right end a projection 448. It can be seen that roller 447 is in contact with cam 442. Usually the weight of the lever itself is sufficient to assure good contact, but, if necessary, an additional spring may be provided for this purpose.

It was already explained and shown in the wiring diagram of Fig. 14 that a switch 426 is mounted directly above the pivoted lever 445. This switch is of the maintained contact type and is actuated by a leaf spring 427 which is so positioned that it is within reach of the projection 448.

Figs. 4 and 8 show that the rotation of cam 442, driven by motor 425, causes roller 447 and therewith with lever 445 with projection 448 to perform a swivel motion around pivot 446. The speed of this swivel motion depends upon the relative position of cam 442 or, more specifically, this swivel motion of lever 445 will be relatively fast when cam 444 is shifted to the left and relatively slow when said cam is shifted to the right. The exposure time can be adjusted in this manner.

Contrast control

The contract control device may theoretically be of any desired type. However, at present, only one practical method to accomplish this is known. This method utilizes a variable contrast paper which is capable of delivering prints of any desired contrast, depending upon the color mixture of the light to which it is exposed. The paper now commercially available delivers a very high degree of contrast if exposed to blue light, but yields very "soft" prints upon exposure to yellow light. Intermediate degrees of contrast can be obtained by correspondingly intermediate color mixtures.

Two principal methods of controlling the color mixture are conceivable. By the first method, a single exposure may be given with the desired color mixture, for example, by placing a suitable filter in front of a substantially white lamp, or we may provide two sources of light of two different colors, respectively, and include means to superimpose these two colored light beams and to control the relative intensity of the two sources. The second method subjects the paper to two subsequent exposures to blue and yellow light, respectively, and changes the relative lengths of the two exposure times. We are making use of this second method.

It is a particular advantage of the mechanism of the time switch just described that by the mere addition of one contact this object can be achieved. It can be seen from Fig. 8 that the length of travel performed by lever 445 is always the same and, therefore, any contact adapted to be actuated by this lever during its travel will be actuated after the lapse of a certain percentage of the total exposure time regardless of the magnitude of said exposure time which depends merely upon the axial position of cam 442. This switch, in turn, controls the action of an electromagnetic filter shifting device placed into the path of the light of the enlarger and which renders said light of one color during the first portion of the exposure, i. e., before said switch is actuated, and of a second color during the second part of an exposure, i. e., after the switch has been actuated. The broad principle of a contrast control device constructed accordingly has been disclosed in Patent No. 2,414,338, issued to us on January 14, 1947.

The electro-magnetic filter shifting device is shown in Fig. 1, and in detail in Figs. 2 and 3, Fig. 2 showing the position during the first and Fig. 3 during the second portion of the exposure. The filter shifting device comprises a baseplate 450 which is fastened to the lens carrier of the enlarger and which, in turn, carries a pivot 451 and a solenoid 430 already shown in wiring diagram of Fig. 14. Supported by pivot 451 is a filter carrier 452 which has two apertures 453 and 454. These apertures are covered with color filters of two different colors, respectively, for example, blue and yellow. The filter carrier is operatively connected on its left end with the armature of a solenoid 430 as well as with a spring 455. It can be seen in Fig. 2 that as long as the solenoid 430 is not energized, spring 455 forces filter 452 into a position in which aperture 453 covered, for example, with a blue filter in front of lens 56 of the enlarger. When the solenoid 430 becomes energized, it shifts filter carrier 452 against the tension of spring 455 into the position shown in Fig. 3 in which aperture 454 covered, for example, with a yellow filter in front of lens 56.

Coming back to Fig. 8 it can be seen that pivoted lever 445 carries a contant 432 and receives current by means of a flexible cable 461 which is also shown in Fig. 14. Above lever 445 a second pivoted lever 470 is arranged, supported by a pivot 471. This lever 470 receives current by means of a flexible cable 472 and carries a contact 431 which is opposite the aforementioned contact 432. On its extreme end lever 470 carries a stud 473 which is in contact with an adjusting mechanism to be described later, by means of which lever 470 can be given any desired angular position. Contacts 431 and 432 form a switch which is in series with solenoid 430, i. e., solenoid 430 attracts filter carrier 452 as soon as contact 432 meets contact 431. This takes place at some instance during the exposure, i. e., when rotating cam 442 forces lever 445 to swivel around pivot 446, contact 432 meets contact 431 sooner or later, depending upon the initial angular position of lever 470. It would appear that the best kinematic conditions could be achieved if pivots 446 and 471 would be made to coincide. This, however, was purposely not done because the displacement of 446 and 471 causes contacts 431 and 432 to perform a small sliding motion relative to each other during the period when they are in contact with each other, and this wiping action is quite effective to keep the electrical contacts clean.

Automatic adjusting mechanism for time switch

It is the purpose of this mechanism to adjust the time switch to the correct exposure time in accordance with a measured light intensity value. Theoretically, it is immaterial whether the exposure time is set in accordance with the light intensity as measured on the brightest point or on the darkest point on the easel, and it is even conceivable to use the average value of the two. In practice, however, it is most convenient to set the exposure time in accordance with the light intensity as measured on the brightest point on the easel because the intensity of this point obviously can be measured with the best of accuracy. This simply means that a print is exposed in such a manner that well exposed shadows can be obtained, and this is also in accordance with best photographic practice. The mechanism consequently comprises a cam which is mounted on the output shaft 186 of the time measuring device for the brightest point, and a system of levers including a cam following roller in contact with the aforementioned cam and an element adapted to slide cam 442 of the time switch on shaft 441. As previously mentioned, the relationship between light intensity L and condenser charging time T was expressed by $$L = \frac{i_2}{K}\left(\frac{1}{\frac{T}{T_0}} - 1\right)$$

The exposure time $t$ can be expressed in terms of light intensity L, and the sensitivity of the photographic paper S by $$t = \frac{1}{SL}$$

The two formulae can be combined to read:

$$t = \frac{K}{Si_2}\left(\frac{1}{\frac{1}{T}-1}\right) \quad (1)$$

The problem is how to use this relationship to compute the configuration of a cam which can be mounted on the output shaft of Fig. 4 of the first time measuring unit. The radius of that cam at any given point must obviously be proportional to the exposure time, but it is also possible to add or subtract any desired constant. In other words, the radius of the cam for $t=0$ does not necessarily have to be zero but may have some value which we shall call $C_3$. The proportionality factor between $r$ and $t$ shall be called $a$ so that we have the relation:

$$r = at + C_3 \quad (2)$$

Since the output shaft during the measuring process rotates with a uniform speed, the angle $\varphi$ traveled by it is proportional to $$\frac{T}{T_0}$$

and the proportionality factor of the two shall be called $C_2$ so that:

$$\frac{T}{T_0} = C_2\varphi \quad (3)$$

By combining formula 1, 2 and 3 we can compute $r$ and obtain $$r = \frac{aK}{Si_2}\left(\frac{1}{\frac{1}{C_2\varphi}-1}\right) + C_3$$

In the interest of simplicity, we call $$\frac{aSK}{i_2} = C_1$$

so that the general equation for the cam in a system of polar coordinates becomes:

$$r = C_1\left(\frac{1}{\frac{1}{C_2\varphi}-1}\right) + C_3$$

A development of this cam is shown in Fig. 9. On the left side the values of $t$ and on the right side the values of $r$ are shown both as function of either $\varphi$ or $$\frac{T}{T_0}$$

It can be seen and it is also obvious from the formula for $r$ that $r$ for $$\frac{T}{T_0} = 1$$

becomes infinite and for values of $$\frac{T}{T_0}$$

approaching unity, it tends to become very large. It is, therefore, impractical to use much more than the left half of this curve and for reasons which will become clear when we later contemplate the corresponding cam for the logarithmic light intensity values, the parts to the extreme left, when $$\frac{T}{T_0}$$

approaches zero also cannot be used. Precisely which parts will be used is, of course, a matter of choice and in this particular example, we have chosen to use the parts between $$\frac{T}{T_0} = .1 \text{ to } \frac{T}{T_0} = .526$$

This corresponds to a change of exposure times in the ratio of 1:10 or for example, for $$\frac{T}{T_0} = .1$$

$t$ becomes 5 seconds and for $$\frac{T}{T_0} = .526$$

$t$ becomes 50 seconds. The parts of the curve which are actually used have in the interest of clarity been shaded.

The same cam in polar coordinates is shown in Fig. 5. The significant points of the cam in Fig. 9 are designated as 210', 211', 212', 213', and they correspond to the points 210, 211, 212, 213 on the actual cam shown in Fig. 5. As can be seen, the portion of the cam between points 212 and 213 has a uniform radius and, therefore, does not really do any work. It would, therefore, be a waste of operating time to construct the circular cam in the same proportions and this section, therefore, has been arbitrarily shortened, as a comparison of the proportions of the circular cam of Fig. 5 to the developed cam of Fig. 9 will show.

The lever system actuated by the cam just described is shown in Figs. 5, 7, and 8. Referring to Fig. 5, a cam following roller 480 is in contact with cam 202. This roller is carried by a lever 481 fastened to a shaft 482. A spring 483 assures contact between roller 480 and cam 202. Shaft 482 is supported by a bearing mounted on baseplate 200, and the shaft extends to the other side of the baseplate, where a relatively long lever 484, seen in Fig. 8, is attached to it. This lever is arranged in the plane of line 8—8 of Fig. 4 and cooperates with a substantially identical parallel lever 485 supported by a pivot 486. The upper ends of levers 484 and 485 engage a part 487 thereby forming a parallelogram movement. Fastened to part 487 is a fork like element 488, the shape of which can be seen in Fig. 4. The two prongs of this fork fit into a groove machined into the hub 443 to which the spiral shaped cam 442 is fastened.

The function of this mechanism is quite simple: The swivel action attributed to lever 481 by the action of cam 202 is transferred through shaft 482 to lever 485, causing the parallelogram movement to rock part 487 in a substantially straight horizontal line with only a relatively small vertical movement causing hub 443 and cam 42 to slide axially on the square shaft 441. The fork like element 488, of course, has a sufficiently deep cut-out so that its small vertical movement will merely cause the two prongs of this fork to slide slightly within the groove of hub 443, but only the horizontal component of the movement of part 487 will be transferred to hub 443.

The angular position of cam 202 depends upon the position in which shaft 186, driven by motor 90, comes to a rest, after condenser 42 has been charged; i. e., it depends directly upon the intensity of the light falling upon the brightest point of the easel. The position of cam 442 controls the exposure time to which the time switch has been set. Cam 202 and the lever mechanism just described therefore form an operative connection by which the exposure time is set automatically in accordance to the measured light intensity of the brightest spot on the easel.

*Automatic adjusting mechanism for contrast control device*

Contrast is by definition the difference of the logarithmic light values of the brightest and of the darkest spot of the image projected on the easel. The automatic mechanism, therefore, must comprise means to convert the charging time of condenser 42 into logarithmic light intensity values for both the brightest and darkest point. These means are cams which are mounted on the output shafts of motors 90 and 95 of the two time measuring units, respectively. These two cams are in operative contact with a lever system which terminates in an element moving in accordance with the difference of the two logarithmic light values, i. e., in proportion to the measured contrast. This element then is operatively connected to the adjustable member of the contrast control device, i. e., to lever 470, Fig. 8. More specifically, this connection comprises a cam carried by the member of the lever system which moves in proportion to the measured contrast and which is in contact with element 473 also shown in Fig. 8.

It is relatively simple to convert the rotary travel of shaft 186 of the first time measuring unit into logarithmic light intensities. In order to compute the configuration of this cam we start again with the original equation for the light value $$L = \frac{i_2}{K}\left(\frac{1}{\frac{T}{T_0}} - 1\right)$$

In logarithmic terms this equation reads $$L = \log \frac{i_2}{K} + \log\left(\frac{1}{\frac{T}{T_0}} - 1\right)$$

The radius R of this cam is proportional to the logarithmic value of L and again an arbitrary constant may be added thereto since R does not necessarily have to become zero when log L becomes zero. We have therefore $$R = b + C_5 \log L$$

where $b$ and $C_5$ are constants. Substituting the above value of log L:

$$R = b + C_5 \log \frac{i_2}{K} + C_5 \log\left(\frac{1}{\frac{T}{T_0}} - 1\right)$$

The angle $\varphi$ of the cam, in a system of polar coordinates, is again proportional to $$\frac{T}{T_0}$$

the proportionality factor being called $C_6$, and for convenience, the terms $$b + C_5 \log \frac{i_2}{K}$$

can be lumped together to form a new constant $C_4$. The equation of the cam in polar coordinates therefore reads:

$$R = C_4 + C_5 \log\left(\frac{1}{C_6 \varphi} - 1\right)$$

A development of this cam is shown in Fig. 10. On the left side we have log L, and on the right side R, both as functions of $$\frac{T}{T_0}$$

or $\varphi$. For $$\frac{T}{T_0} = 0$$

log L becomes infinite and for $$\frac{T}{T_0} = 1$$

log L becomes negatively infinite. The usable portion of that cam must, therefore, not approach the zero value or the unity value of $$\frac{T}{T_0}$$

too closely. As a convenient value, we have chosen to start with $$\frac{T}{T_0} = .1$$

and extend the cam to $$\frac{T}{T_0} = .526$$

which means that log L varies between .954 and −.046; in other words, the difference between the two logarithmic values is one, or the linear light intensity for $$\frac{T}{T_0} = .1$$

is 10 times as large as the linear light intensity for $$\frac{T}{T_0} = .526$$

As can be seen in Fig. 10, the initial value of R for $$\frac{T}{T_0} = 0$$

has been chosen rather large and the useful area of the cam in the developed presentation in Fig. 10 has again been shaded for convenience. The actual cam can be seen in Fig. 5. The significant points of the developed cam in Fig. 9 are designated at 230′, 231′, 232′ and 233′. They correspond to points 230, 231, 232 and 233 on the actual circular cam shown in Fig. 5. Again, the radius of the cam between points 232 and 233 is constant so that no real work is performed in this portion. This part has, therefore, been arbitrarily shortened in order to save operating time, as a comparison between the circular cam shown in Fig. 5 and the developed cam shown in Fig. 10 will show.

While it would, of course, be entirely feasible and practical to have the two cams which are mounted on shaft 186, i. e., the cam converting the travel of the first time measuring unit into exposure times and the cam just described converting said travel into logarithmic time intensity values, individually and separately mounted in two planes on shaft 186, the actual construction can be somewhat simplified due to the fact that either cam occupies less than 180°. This makes it possible to arrange both cams in one plane so that the two apparently constitute one single cam which is shown in Fig. 5. The left half of this cam performs the function of converting the measured condenser charging time into paper exposure time, whereas the right half of this cam performs the function of converting the same condenser charging time into logarithmic light intensity values. The two parts are connected by lines 213—230 and 219—233 which may be of any convenient shape.

The rotary travel of shaft 286 of the second time measuring unit is converted into logarithmic light intensities by a similar cam which has already been shown as 302 in Fig. 4.

The design of cam 302 is based on the triple cycle described in a previous paragraph, and a developed representation of it is shown in Fig. 11. It can be seen that the effective circumference of the cam has three divisions, each of which are substantially identical to the configuration of the cam shown in Fig. 10. The three branches of the curve are, of course, radially displaced with respect to each other in such a way that the maximum radius of one portion is identical with the minimum radius of the adjacent portion. The formulae for these branches are precisely identical to the formula for the cam curve in Fig. 10 with the exception, of course, that different constants may be chosen:

$$R_1 = C_7 + C_8 \log\left(\frac{1}{C_9 \varphi} - 1\right)$$

$$R_2 = C_{10} + C_{11} \log\left(\frac{1}{C_{12} \varphi} - 1\right)$$

$$R_3 = C_{13} + C_{14} \log\left(\frac{1}{C_{15} \varphi} - 1\right)$$

The significant points of the developed cam of Fig. 11 are 360', 361', 362', 363', 364', 365', 366' and 367' which correspond to points 360 to 367 of the circular cam on Fig. 5. Again, certain parts with a constant radius have been arbitrarily shortened to save operating time. In the development of this cam shown in Fig. 11, we have also shown in the interest of clarity the function of the two circuit elements 100 and 101 to show the angular relations between the effective parts of these elements and the three branches of the cam.

The two cams just described translate condenser charging times into logarithmic light intensities of the lightest and darkest points of the easel, respectively. A mechanism is provided which derives from these two cams the difference of the two logarithmic light values or the contrast of the projected image.

While a great number of mechanisms are conceivable which would serve this purpose, we prefer the following construction which is exceedingly simple:

A pivoted lever 400 carries two cam following rollers 401 and 402 which are in contact with cams 202 and 302, respectively. The pivot point of this lever is 404 which is carried by a second pivoted lever 405. This last lever is supported by the stationary pivot 406 which is fastened to baseplate 200, and carries on its other end a cam 501 to be described later. A spring 410 biases lever 400 in a clockwise direction. Due to this bias the two cam following rollers 401 and 402 are always in contact with cams 202 and 302, respectively.

The function of this device is quite simple. Assuming that only cam 202 moves and cam 302 remains stationary, an increase or decrease in the radius of cam 202 will cause lever 400 to swivel around the contact point between cam 302 and roller 402. It can be easily seen that pivot point 404 then performs a movement which equals half the increase or decrease of the radius of cam 202. In like manner, assuming that cam 202 remains stationary and cam 302 rotates, lever 400 performs and the pivot point 404 participates in this movement to the extent that it is displaced by half of the displacement of roller 402 or, which is the same, by half the increase or decrease of the radius of cam 302.

It can be seen that an increase of the radius of cam 202 as well as an increase in the radius of cam 302 will cause lever 400 to rotate in a counter-clockwise direction. If the two increments are the same, pivot point 404 will remain stationary and consequently lever 405 will also remain stationary. If, however, the increase of the radius of cam 202 is different from the increase of the radius of cam 302, pivot point 404 will be displaced and this displacement will equal half the difference of the two radial increases, or the displacement of pivot point 404 and therewith the movement of lever 405 will be in proportion to the difference of the two radii or of the two logarithmic light intensities.

The angles of the arcs described by rollers 401 and 402, and by point 404, must, of course, be reasonably small, so that the arcuate paths of these elements do not deviate appreciably from straight lines.

Lever 405 must be operatively connected to lever 470 of the contrast control device as shown in Fig. 8, and this connection must be based on the characteristics of the variable contrast paper which are briefly as follows, the figures mentioned in the following paragraph being typical, while their exact numerical value may differ, depending upon individual properties of different emulsions.

Negatives of very low contrast cannot be printed successfully at all since even with 100% blue illumination the paper will not be contrasty enough to produce a satisfactory picture. The minimum contrast necessary to obtain a good print with 100% blue illumination is approximately 1.0. Negatives which have a higher contrast must receive correspondingly less blue and more yellow light, and the relationship from there on between contrast and color mixture is very nearly straight line. Negatives having a contrast of 1.75 require 100% yellow light to yield a satisfactory print. From then on perfect prints are no longer obtainable since negatives with a contrast higher than 1.75 would theoretically call for colors with more than 100% yellow which is manifestly impossible. These color mixtures are controlled by the angular position of lever 431. The lowest or horizontal position of said lever brings 431 and 432 into contact at the very beginning of the exposure, thereby placing the blue filter in front of the lens during the entire exposure time. Conversely, with lever 470 in the highest possible position, contact between 431 and 432 takes place at the very end of the exposure only, or the yellow filter is in front of the lens at all times. Intermediate positions of lever 470 will yield correspondingly intermediate color mixtures.

The connection between lever 405 and lever 470 is, therefore, formed by a cam 501 which is carried by lever 405 and whose configuration is designed to meet the requirements outlined in the proceeding paragraph. This cam, shown in Figs. 5 and 6, is in operative contact with a roller 499 which is mounted on stud 473, visible in Fig. 8. 473 is carried by lever 470 and its position is, therefore, controlled by the shape of cam 501. This cam comprises three parts, a first part between points 502 and 503 with a constant radius, the second part between points 504 and 505 with another constant but larger radius, and a connecting section between points 503 and 504. For paper of the characteristics as described, roller 499 should arrive at point 503 when the contrast of the image equal 1.00 and it should arrive at point 504 when said contrast reaches a value of 1.75. Perfect pictures can only be obtained as long as the contrast of the image falls between these two extremes, i. e., as long as roller 499 rests after the measuring period between points 403 and 405 as, for example, shown in Fig. 6.

*Operation*

From the operator's viewpoint the operation of the device is exceedingly simple. The operator first places switch 420 into the "measuring" position, depresses push buttons 250 and 350 and causes thereby the two time measuring devices to return to their starting points. The operator then tests the leakage conditions of the device by covering the photocell and depressing button 152, the "on" button for the brightest point on the easel. After a short interval of time, pointer 205 should then appear in window 257 and come to a standstill in register with line 256. If the pointer 205 overshoots this line or comes to a standstill before it reaches it the device has either more or less leakage than expected and this can be changed by adjusting knob 75' in one direction or the other. The device should then be reset by depressing button 250 and tried again by depressing push button 152 until pointer 205 comes to a standstill on line 256. The device is then reset by depressing push button 250 again. Handwheel 44' must, before the final operation of the device, be adjusted for the sensitivity of the sensitized paper which the operator expects to use for the print. The photocell is then uncovered and placed on the easel of the enlarger in which a negative has been placed and which has been adjusted for the desired magnification ratio and diaphragm setting of the lens. The photocell is then shifted on this easel until the brightest point on the image falls on the window in the top wall of the photocell housing. Push button 152 is then depressed and the operator waits until the movement initiated thereby is finished. The photocell is then shifted until the darkest point on the easel is projected into the window. Push button 153 is now depressed and when the movement induced thereby is finished, the time switch and the contrast control device are automatically adjusted to their correct settings. The photocell is then removed from the easel, switch 220 is placed into the "exposure" position, a sheet of sensitized paper is placed on the easel, and an exposure is initiated by depressing push button 421. What happens within the device will be described in the following paragraphs.

When the operator depresses push buttons 250 and 350 for resetting purposes, he lifts the tips of ratchets 241 and 341 so as to bring them out of engagement with the ratchet gears 203 and 303, see Figs. 5 and 6. In the case of push button 350 this is done by the action of the tapered part 252 which, by its horizontal movement from left to right, forces roller 246 upward. This roller is supported by a bracket 245 which, in turn, is fastened to the ratchet 341. Push button 250 is, of course, associated with a corresponding mechanism which actuates ratchet 241. As soon as the two ratchets lose contact with ratchet gears 203 and 303, springs 240 and 340 which are fastened to pulleys 204 and 304 cause these pulleys together with all elements mounted on the respective output shafts 186 and 286 of the first and second time measuring unit to rotate in a clockwise direction until they are stopped by stop pins 255 and 355, i. e., until all these elements assume the position which is shown in Fig. 5.

For the test of the leakage conditions of the device the photoelectric multiplier cell 20 should be covered, i. e., no current should circulate between the taps of the potentiometer 41 and the corresponding electrodes of the multiplier tube 20 except such leakage currents as are inevitable due to the impossibility of providing perfect insulation. The condenser 42 is then charged solely by the current supplied by the second charging circuit, i. e., by the current which passes from condenser 72 through the current limiting photocell 73. Condenser 72, in turn, is charged from the transformer secondary coil 70 through rectifying tube 71 and the current passing current limiting photocell 73 depends upon the illumination which this photocell receives from the small incandescent lamp 74. This current can be adjusted by rheostat 75 actuated by handwheel 75'. Any adjustment of rheostat 75 will increase or decrease the light of incandescent lamp 74 and thereby increase or decrease the current circulating within the second charging circuit of the condenser, and this will charge condenser 42 faster or slower. If the charging time of the condenser 42 should be different from a standard time the leakage somewhere in the system has obviously changed and the original time required to charge condenser 42 to a predetermined voltage by the second charging circuit alone can be restored by adjusting rheostat 75 in one direction or the other.

The sensitivity of the photocell 20 can be adjusted by adjusting potentiometer 44. Mechanically this is done by manipulating handwheel 44'. The adjustment of potentiometer 44 changes the voltage impressed upon adjacent electrodes of the photo multiplier tube and this is a very effective means for adjusting the sensitivity of this cell to light. This adjustment is used to change the light sensitivity of the photocell in proportion to the light sensitivity of the sensitized bromide paper which the operator has selected for the future print.

For the final operation of the device, it is immaterial whether the brightest or the darkest point on the easel is measured first and merely by way of example we shall describe the measuring process for the brightest point first. Before the start of this measuring process, push button 250 must, of course, be pressed again so that the device starts from the zero setting. Referring to the circuit diagram shown in Fig. 14 it can be seen that condenser 42 before the beginning of the measuring process is short circuited by normally closed relay contacts 161 and 171 which are connected in series with each other. The two motors 90 and 95 are permanently connected to the line and rotate continuously but since the clutches 91 and 96 are deenergized, the output shafts 186 and 286 of the two time measuring units are stationary. The operator now depresses push button 152. This closes the normally open push button contact 152" and closes a circuit in series with the normally closed push button contact 153' of the second push button 153, and with the normally closed contact 92 of relay 85, thereby energizing relay coil 160 and clutch 91. Clutch 91 causes magnet 185 to attract iron disc 182 whereupon output shaft 186 with all the elements associated with it begins to rotate in a counter-clockwise direction, see Figs. 5 and 6. As soon as relay coil 160 becomes energized, normally open relay contact 162 closes, normally closed relay contact 161 opens, and normally open relay contact 163 closes. 162 is connected in parallel to 152" and therefore constitutes a "hold-in" contact which keeps relay coil 160 energized even after the operator ceases to depress push button 152. The opening of 161 interrupts the short circuit of condenser 42 which now begins to accumulate a charge by the combined actions of the first and second charging circuit. The closing of contact 163 causes current to pass solenoid 136 which attracts diaphragm 127 and places the smallest aperture 130 in front of the photo sensitive electrode 21 of the photoelectric multiplier tube 20. The light striking this photo sensitive electrode causes a relatively small number of electrons to strike the next electrode 22 where they release secondary electrodes which, in turn, strike electrode 23 and release, therefore, tertiary electrons, and this is repeated at each subsequent electrode. The electrons released at each electrode are more numerous than the electrons which cause their release and, consequently, a relatively heavy current begins to circulate in the last loop of the network connecting the taps of potentiometer 41 to corresponding electrodes of tube 20. This loop is formed by the connections between points 39 and 40 to electrodes 29 and 30, respectively. The result of this circulating current is that condenser 42 accumulates a charge, its upper terminal becoming more and more positive and its lower terminal becoming more and more negative. The upper terminal is connected to the grid 82 of thyratron 80 and the lower terminal is connected in series with the left portion of potentiometer 87 to the cathode 81 of this thyratron. Condenser 42 and the left portion of potentiometer 87 are of opposite polarity and, at the beginning of the measuring circuit, the grid of the thyratron is, therefore, highly negative with respect to the cathode. This negative bias diminishes during the measuring process and, as soon as the difference becomes small enough, the thyratron which, due to the negative bias, has not conducted any current up to now, breaks down and becomes current conducting. This usually takes place when the grid becomes less than —2 volts negative with respect to the cathode. The time required to charge condenser 42 up to the critical voltage necessary for this condition thereby constitutes a measure of the intensity of the light impinging upon the photosensitive electrode 21 of the multiplier tube 20. As soon as the thyratron 80 begins to conduct current, alternating current originating in secondary transformer coil 84 energizes relay coil 85, thereby opening the normally closed contact 92. The opening of this contact 92 interrupts the current which kept relay coil 160 and clutch 91 energized whereupon relay contacts 162 and 163 become open and contact 161 becomes closed again. This last action short circuits and thereby discharges condenser 42 which is now ready for the next measuring process. During the time required to charge condenser 42 to its critical voltage, output shaft 186 of the first time measuring unit, Fig. 4, keeps rotating due to the action of clutch 91 which connects output shaft 186 to the shaft 180 of motor 90. The angle of this rotation is proportional to the time required to charge the condenser and is thereby a measure of the light intensity of the brightest point of the easel. Cam 202 participates in this rotation and causes a corresponding movement of cam following roller 480 and lever 481. It also causes a movement of cam following roller 401 and a movement of levers 400 and 405. The position that these last two parts assume after the end of the first time measuring process is, however, of no significance as long as the intensity of the darkest point of the easel has not yet been measured.

Lever 481 is fastened to shaft 482. Shaft 482 extends to the other side of baseplate 200 and there lever 484 is fastened to shaft 482. Consequently, a swivel motion of lever 481 induced by the rotation of cam 202 is transferred through shaft 482 to lever 481. Lever 484 forms together with lever 485 and part 487 a parallelogram movement and the swivel motion of lever 484 causes this parallelogram to perform a rocking motion moving part 84 substantially in a horizontal direction. Part 487 carries fork like element 488 which engages the hub 443 of spiral cam 442 which likewise moves in a horizontal direction, sliding on square shaft 441. The position of cam 442 determines the speed with which, during a subsequent exposure, lever 444 will rotate around pivot 446 and determine, therefore, the exposure time. Consequently, the light impinging upon photocell 20 causes cam 202 to rotate by a certain angle which, in turn, causes, by the mechanism just described, cam 442 to assume a certain position or the time switch is automatically adjusted to the correct exposure time by these means.

The intensity of the darkest point on the easel is measured by shifting the photocell 20 with its housing until this darkest point is projected into the window of this housing. After push button 153 is depressed, another condenser charging and time measuring process is initiated which electrically is identical to the process applied to the brightest point on the easel which has just been described. However, due to the fact that the light intensity of the darkest point of the easel may possibly change within much wider limits than the light intensity of the brightest point, provisions have been made to cause the second time measuring device to run through its operating cycle not once, as the first time measuring unit, but three times. Progressively larger apertures are placed in front of the photocell for the three subsequent cycles and the condenser 42 is automatically discharged between cycles. For the following detailed description it may be presupposed that we are dealing with an extremely contrasty negative. What happens in this case is as follows:

As soon as the operator depresses push button 153, he closes the normally open push button contact 153" and closes a circuit which is in series with the normally closed push button contact 152' of the first push button 152 and with the normally closed contact 92 of relay coil 85, thereby energizing relay coil 170 and clutch 96. Energizing clutch 96 causes the output shaft 286 with all the elements associated with it to rotate in a counter-clockwise direction, see Figs. 5 and 6. As soon as relay coil 170 becomes energized, normally open relay contact 173 closes, normally closed contact 171 opens, normally open contact 172 closes and the two normally open contacts 174 and 175 close. 173 is connected in parallel to 153" and therefore constitutes a "hold-in" contact which keeps relay coil 170 energized even after the operator ceases to depress push button 153. The opening of 171 interrupts the short circuit of condenser 42 which now again begins to accumulate a charge. The closing of contact 172 makes it possible for the current conducting strips 102 and 103 on rotating switch element 100 to connect spring contacts 106 and 107 and thereby to discharge condenser 42. This, however, takes place only between the first and second, and between the second and third operating cycle. In like manner the closing of contacts 174 and 175 makes it possible for the current conducting strip 105 on rotating switch element 101 to shorten either spring contacts 111, 112 or spring contacts 109, 110. The first pair is shorted during the first operating cycle thereby energizing solenoid 136 and placing the smallest aperture 130 in front of the light sensitive electrode 21 of photocell 20. The second pair of spring contacts 109, 110 is shorted during the second operating cycle thereby energizing solenoid 135 which places the next larger aperture 129 in front of the photocell 20. During the third operating cycle neither pair of spring contacts is connected and both solenoids 135, 136 are, therefore, currentless during this period. Consequently, the light admittance of the photocell is then controlled entirely by the largest aperture 125 built into the housing of the photocell.

Condenser 42 is again charged in precisely the same manner as described above by the combined action of the first and of the second charging circuit and again renders thyratron 80 current conducting as soon as it accumulates enough charge to render the grid of this thyratron less than −2 volts negative with respect to the anode. We have assumed that we are now dealing with an extremely contrasty negative. In this case the darkest point will receive so little light that condenser 42 does not reach the critical voltage during the first operating cycle or, in mechanical terms, points 362 of the cam circumference will pass cam following roller 402 and still the condenser will not have reached a voltage high enough to bring the device to a standstill by the action of thyratron 80 and relay coil 85 with its normally closed contact 92. The consequence is that motor 95 continues to rotate. The rotating switch element 100 then discharges the condenser 42 and opens the circuit again so that the second operating cycle begins and condenser 42 can accumulate a charge again. Since we have assumed that the negative is extremely contrasty and the darkest point, therefore, receives very little light, the condenser 42 will still not reach the critical voltage during the second operating cycle even though the light admittance of the photocell is now ten times larger due to the larger area of aperture 129 which is now in front of the photocell because rotating switch element 101 now energizes solenoid 135 thereby attracting diaphragm blade 128. In other words, point 364 on the circumference of the cam will also pass cam following roller 402 without the condenser having reached the critical voltage where thyratron 80 becomes current conducting. Again rotating switch element 100 short circuits condenser 42 and rotating switch element 101 now renders both solenoids 135 and 136 currentless. The light admittance of the photocell is now governed by the large aperture 125 in the top wall of the photocell housing. During the third operating cycle, i. e., after point 365 of the coil 302 has passed cam following roller 402, condenser 42 will again become charged, but this time at a still higher rate of speed due to the new 100 times higher light admittance of the largest aperture 125. Eventually when some point between points 365 and 366 of cam 302 passes cam following roller 402 the condenser 42 will have a voltage sufficiently high to render grid 82 less than −2 volts negative with respect to the cathode 81 of thyratron 80 whereupon this thyratron becomes current conducting and causes relay coil 85 to open normally closed relay contact 92. The opening of this contact in turn opens relay coil 170 and the clutch 96, thereby bringing the entire measuring process to an end and output shaft 286 with its associated parts to a standstill.

For less contrasty negatives the critical point may be reached long before the second time measuring unit enters its third operating cycle. The device may, for example, come to a standstill sometime during the second operating cycle, i. e., when cam following roller 402 is in contact with some point between points 363 and 364. For negatives of very low contrast this may even take place during the first operating cycle, i. e, when roller 402 is in contact with some point of the cam between points 361 and 362.

It has been explained above that the mechanical movement which comprises the two cam following rollers 401 and 402, first pivoted lever 401 and second pivoted lever 405 assumes a position indicative of the difference between the radii of the respective cams 202 and 302 or proportional to the difference of the logarithmic light intensity values of the brightest and darkest point on the easel. This position is translated into a suitable color mixture for the subsequent exposure by means of cam 501 which actuates a roller 499 which is fastened on a stud 473 and controls the position of lever 470 of the contrast control device. All elements of the time and contrast control mechanism are shown in Fig. 5 before the beginning and in Fig. 6 after the end of the light measuring process. Point 503 of cam 501 corresponds to the minimum contrast necessary for a satisfactory print, and point 504 corresponds to the point of maximum contrast for a satisfactory print. Between those points good prints can be obtained and by means of the mechanism just described the color mixture is adjusted in proportion to the contrast of the image projected on the easel. The portions of the cam to the left of point 503 have a constant radius which means that the position of lever 470 and thereby the color mixture will not be affected and will remain 100% blue, but even though the most contrasty print is obtained in this manner, satisfactory prints cannot be obtained because the contrast of the projected image is too low. Likewise, the portion of the cam to the right of point 504 has a constant radius, keeping lever 470 permanently in its most elevated position, thereby assuring a 100% yellow print color. This yields the softest possible print, but this print will not be satisfactory since the contrast of the projected image in this region is too high.

Referring to Fig. 8, the position of lever 470 determines the instance during the exposure, i. e., during the travel of lever 445, when contacts 431 and 432 meet. Prior to this instance relay 430 of the electro-magnetic color shifting device remains deenergized, placing the blue filter in front of the lens, but after this instance, solenoid 430 receives current, attracts its armature, and places the yellow filter in front of the enlarger lens. The relative exposure times given with blue and yellow colors, respectively, in turn, determine the contrast of the finished print.

The action of the automatic adjustment of the contrast control device, therefore, is briefly as follows: The two cams 202 and 302 rotate for a length of time which depends upon the light impinging upon the photocell when it is placed on the lightest and darkest point of the easel, respectively. The position which these two cams assume, in turn, determines the position of rollers 401 and 402 causing a corresponding adjustment of lever 400 and of the larger lever 405 supporting lever 400. Cam 501 is carried by lever 405 and causes the angular adjustment of lever 470, determining the instance when, during a given exposure time, the color of the light is switched from blue to yellow, thereby determining the contrast of the finished print.

The print control device is now correctly adjusted for the proper exposure time and for the proper contrast and the operator is ready to make a print. He removes the photocell from the easel, places switch 420 into the "exposure" position, and places a sheet of sensitized paper on the easel. He then depresses push button 421. This closes a circuit which energizes simultaneously motor 425 of the timer and lamp 53 of the enlarger, thereby starting the exposure. Motor 425 drives shaft 441 and therewith spiral shaped cam 442. This, in turn, causes lever 445 to perform a rotary movement around its supporting pivot 446. During the first portion of this movement, contacts 431 and 432 are out of touch with each other and, therefore, solenoid 430 is not energized and the blue filter is in front of the enlarger lens. At some instance during the exposure time, contacts 431 and 432 meet and now solenoid 430 is energized, attracts its armature, and places the yellow filter in front of the enlarger. The relative lengths of the two exposure times are determined by the initial position of lever 470, and this color mixture, in turn, determines the contrast of the print. At the end of the exposure, projection 448 of lever 445 meets leaf spring 427 of contact 426, thereby opening it and rendering simultaneously motor 425 and lamp 53 currentless, thereby terminating the exposure. The length of the exposure depends upon the horizontal position of cam 442, the farther this cam is shifted to the left, the higher becomes the speed of lever 445, and the shorter the exposure time. Conversely, a shift of 442 to the right lowers the speed of rotation of lever 445, thereby prolonging the exposure time.

What we claim as new is:

1. A print control instrument for photographic enlargers of the type which is equipped with a source of light and which projects an image of a transparency on an easel, adapted first to measure the respective light intensities on the brightest and darkest point on said easel, and subsequently to produce a print of correct density and contrast on a sensitized sheet placed on said easel, comprising three parts: the first part comprising a movable photoelectric cell, adapted to be placed on the brightest and on the darkest point on said easel, an electric circuit in operative relationship with said cell, including a condenser adapted to change its voltage upon exposure of said cell to light, and means to measure the time required for a voltage change of a predetermined magnitude, two movable elements actuated by said circuit and adapted to be displaced during time measuring periods in accordance with the current passing said cell when it is placed on said brightest and darkest point, respectively, a differential mechanism in operative relationship with said two movable elements, and a third movable element, actuated by said mechanism and adapted to assume a position in accordance with the difference of the displacements of said two first named movable elements; the second part comprising means to control the density of said print including a time switch and means to adjust the length of time during which said print is exposed to light, and means to control the contrast of said print including means to adjust the color composition of the light to which said print is exposed; the third part comprising a first connecting mechanism in operative relationship simultaneously with one of said first named two movable elements of the first part and with said means to adjust the length of the exposure time of the second part, and a second connecting mechanism in operative relationship simultaneously with said third movable element of the first part and said means to adjust the color composition of the light of the second part; whereby said means to control the exposure time and said means to control the color composition of the light are automatically adjusted by the act of measuring the light intensities of the brightest and darkest point on the easel, and whereby the device thus adjusted subsequently produces on a sensitized sheet a print of the correct density and contrast.

2. A print control instrument according to claim 1, said condenser operatively connected to two parallel charging circuits and adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, and said second charging circuit comprising a second source of voltage and means to limit the current of said second charging circuit to a substantially constant value, said second source of voltage, said current limiting means, and said condenser connected in series, whereby said condenser is charged with a constant rate of speed, independent of the intensity of said light.

3. A print control instrument according to claim 1, said condenser operatively connected to two parallel charging circuits and adapted to be charged by them simultaneously, said first charging circuit comprising a first source of voltage and a photoelectric cell, adapted to be placed substantially into the same plane as said sensitized sheet during the actual exposure, said photoelectric cell being of the multiplier type including a photo emissive cathode and a number of anodes, said number being called "n," said source of voltage including a voltage divider with a starting tap and a number of additional taps, said number again being called "n," the starting tap being of negative polarity and connected to said cathode, the other taps being progressively more positive and connected to corresponding anodes of said multiplier tube, and said condenser being inserted into the connection between the $(n-1)$st tap and the $(n-1)$st anode, whereby said condenser, upon exposure of said photoelectric cell to light, is charged with a rate of speed in dependence of the intensity of said light, and said second charging circuit comprising a second source of voltage and means to limit the current of said second circuit to a substantially constant value, said second source of voltage, said current limiting means, and said condenser connected in series, whereby said condenser is charged with a constant rate of speed, independent of the intensity of said light.

4. A print control instrument according to claim 1, said condenser operatively connected to two parallel charging circuits and adapted to be charged by them simultaneously, said first charging circuit comprising a first source of voltage and said photoelectric cell, adapted to be placed substantially into the same plane as said sensitized sheet during the actual exposure, said first source of voltage, said photoelectric cell and said condenser connected in series, whereby said condenser, upon exposure of said photoelectric cell to light, is charged with a rate of speed depending upon the intensity of said light, said second charging circuit comprising a second source of voltage and means to limit the current of said second charging circuit to a substantially constant value, said second source of voltage, said current limiting means, and said condenser connected in series, whereby said condenser is charged with a constant rate of speed, independent of the intensity of said light, and means to adjust said current limiting means until, without any light impinging on said photoelectric cell, said condenser is charged by said second charging circuit alone to a predetermined voltage in a predetermined time, whereby any accidental leakage in the circuit of said condenser can be substantially compensated for.

5. A print control instrument according to claim 1, said condenser operatively connected to two parallel charging circuits and adapted to be charged by them simultaneously, said first charging circuit comprising a first source of voltage and a first photoelectric cell, adapted to be placed substantially into the same plane as said sensitized sheet during the actual exposure, said first source of voltage, said first photoelectric cell, and said condenser connected in series whereby said condenser, upon exposure of said photoelectric cell to light, is charged with a rate of speed in dependence of the intensity of said light, and said second charging circuit comprising a second source of voltage and means to limit the current of said second circuit to a substantially constant value, said second source of voltage, said current limiting means, and said condenser connected in series, whereby said condenser is charged with a constant rate of speed, independent of the intensity of said first mentioned source of light, said current limiting means comprising a second photoelectric cell and means to illuminate said second photoelectric cell with a constant intensity, independent of the intensity of said first mentioned source of light within said enlarger.

6. A print control instrument according to claim 1, said condenser operatively connected to two parallel charging circuits and adapted to be charged by them simultaneously, said first charging circuit comprising a first source of voltage and a first photoelectric cell, adapted to be placed substantially into the same plane as said sensitized sheet during the actual exposure, said first source of voltage, said first photoelectric cell, and said condenser connected in series whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said first mentioned source of light, said current limiting means comprising a second photoelectric cell and means to illuminate said second photoelectric cell with an intensity independent of the intensity of said first mentioned source of light within said enlarger, and means to adjust said last named illuminating means to adjust the current of said second charging circuit, until said condenser, without any light impinging upon said first photoelectric cell, becomes charged, by said second charging circuit alone, to a predetermined voltage in a predetermined time, whereby any accidental leakage in the circuit of said condenser can be substantially compensated for.

7. A print control instrument according to claim 1, said photoelectrc cell being of the multiplier type including a photo emissive cathode and a plurality of anodes, said associated circuit comprising a source of direct current and a voltage divider connected thereto with a starting tap and a plurality of additional taps, the number of additional taps being equal to the number of anodes, the starting tap being of negative polarity and connected to said cathode, the other taps being progressively more positive and connected to corresponding anodes of said multiplier tube, and means to adjust the voltage of said direct current whereby the light sensitivity of said photoelectric cell can be changed in accordance with the light sensitivity of said sensitized sheet.

8. A print control instrument according to claim 1, said electric circuit comprising means to short circuit said condenser before the start of the measuring process, a source of current in series with said condenser and said photoelectric cell, means to render said short circuiting means inoperable after the start of the measuring process, whereby said condenser accumulates a charge which increases during the measuring process at a rate of speed in accordance with the intensity of the light impinging upon said photoelectric cell, and means to indicate when said charge equals a voltage of a predetermined magnitude.

9. A print control instrument according to claim 1, said electric circuit comprising means to short circuit said condenser before the start of the measuring process, a first source of direct current in series with said condenser and said photoelectric cell, means to render said means to short circuit inoperable after the start of the measuring process, whereby said condenser accumulates a charge which increases during the measuring process at a rate of speed in accordance with the intensity of the light impinging upon said photoelectric cell, and means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby the voltage of said grid with respect to the cathode of said thyratron becomes equal to the difference of the voltages of said second source of direct current and of said condenser, so that the thyratron is rendered non-conducting before and during the light measuring process as long as said condenser voltage is small and the grid therefore highly negatively biased with respect to the cathode, but becomes current conductive at the end of the measuring process as soon as said voltage difference, due to the rising condenser voltage, falls below a critical value, said anode circuit including a source of alternating current, and a load device, in series connection with said thyratron and said source of alternating current, and actuated by the anode current of said thyratron at the end of the measuring process.

10. A print control instrument according to claim 1, said first part comprising two time measuring devices, adapted to measure, respectively, the charging time of said condenser when said cell is placed on the point of brightest and darkest light intensity on said easel, each comprising a constant speed motor, an electromagnetic clutch, an output shaft, means to keep said clutch deenergized before the measuring process, and means to energize said clutch during and deenergize it at the end of the measuring process, whereby said output shaft rotates during the charging time of said condenser, the angle of rotation being proportional to said charging time of said condenser and thereby in accordance with the light intensity to be measured.

11. A print control instrument according to claim 1, said electric circuit comprising means to short circuit said condenser before the start of the measuring process, a first source of direct current in series with said condenser and said photoelectric cell, means to render said short circuiting means inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby said thyratron is rendered nonconducting before and during the measuring process, but becomes conductive at the end of said process, said anode circuit including a source of alternating current and a relay with an armature and contacts, said armature in series connection with said thyratron and said source of alternating current and actuated by the anode current of said thyratron at the end of the measuring process, and two time measuring devices adapted to measure, respectively, the charging time of said condenser when said cell is placed on the point of brightest and darkest light intensity on said easel, each comprising a constant speed motor, an electromagnetic clutch, an output shaft, means to keep said clutch deenergized before the measuring process, and means operatively connected to said relay contacts to energize said clutch during and deenergize it at the end of the measuring process, whereby said output shaft rotates during the charging time of said condenser, the angle of rotation being proportional to said charging time of said condenser and thereby in accordance with light intensity to be measured.

12. A print control instrument according to claim 1, said first part comprising two time measuring devices adapted to measure, respectively, the charging time of said condenser when said cell is placed on the point of brightest and darkest light intensity on said easel, each comprising a constant speed motor, an electromagnetic clutch, an output shaft, means to keep said clutch deenergized before the measuring process, and means to energize said clutch during and deenergize it at the end of the measuring process, and means urging said shaft to return to its starting position, means maintaining said shaft after the end of the measuring process in its most advanced position against said urging means, and means under the control of the operator to render said last named means inoperative for resetting purposes.

13. A print control instrument according to claim 1, including a housing for said photoelectric cell, adapted to be placed on said easel, an aperture in the top wall of said housing, and means to adjust the size of said aperture, whereby the sensitivity of said photoelectric cell to light can be controlled.

14. A print control instrument according to claim 1, including a housing for said photoelectric cell, an aperture in the top wall of said housing, and electromagnetic means to change the size of said aperture, said electric circuit comprising, means to short circuit said condenser before the start of the measuring process, a source of current in series with said condenser and said photoelectric cell, means to render said short circuiting means inoperable after the start of the measuring process, whereby said condenser accumulates a charge which increases during the measuring process at a rate of speed in accordance with the intensity of the light impinging upon said photoelectric cell, means to indicate when said charge equals a voltage of a predetermined magnitude, two time measuring devices, the first device adapted to measure the charging time of said condenser when said cell is placed on the brightest point on said easel, and the second device adapted to measure the charging time of said condenser when said cell is placed on the darkest point, each comprising a constant speed motor, an electromagnetic clutch, an output shaft, means to keep said clutch deenergized before the measuring process, and means to energize said clutch during and deenergize it at the end of the measuring process, and means operatively connected to the output shaft of said second time measuring device to short circuit said condenser at spaced intervals, and means also operatively connected to said shaft to actuate said electromagnetic aperture changing means between said intervals, said aperture being made progressively larger during successive periods, whereby said second time measuring device may run several times through its measuring process with progressively larger apertures and proportionately increased light sensitivity, so that a wide range of light intensity values can be measured.

15. A print control instrument according to claim 1, said means to control the exposure time comprising a time switch including a pivoted lever, means to rotate said lever, means to adjust the speed of said rotation, and a switch controlling the source of light on the enlarger, said switch adapted to be actuated by said pivoted lever at the end of its travel, whereby said source of light is shut off.

16. A print control instrument according to claim 1, said means to control the exposure time comprising a time switch including a pivoted lever, means to rotate said lever including an electric motor, a shaft of polygonal cross-section driven by said motor through a train of gears, a spiral shaped cam driving said lever and having a hub with a correspondingly polygonal hole mounted slidably on said shaft, means to adjust the speed of rotation of said lever by sliding said cam on said shaft, and a switch controlling the source of light of the enlarger, said switch adapted to be actuated by said lever at the end of its travel, whereby said source of light is shut off.

17. A print control instrument according to claim 1, said means to control the contrast of the print comprising means to adjust the color composition of the light to which said print is exposed.

18. A print control instrument according to claim 1, said means to control the contrast of the print comprising means to adjust the color composition of the light to which said print is exposed including a plurality of light filters of different colors, and means to shift one of said filters into a position between the source of light of the enlarger and the easel.

19. A print control instrument according to claim 1, said means to control the contrast of the print comprising means to divide the exposure time as controlled by said time switch into two part exposure times, including means to adjust the ratio of said part exposure times without affecting their sum, means to change the color of the light to which said print is exposed, and means to actuate said color changing means at a preselected time during the exposure, whereby the print is exposed to light of one color during the first part exposure, and to light of another color during the second part exposure.

20. A print control instrument according to claim 1, said means to control the exposure time comprising a time switch including a pivoted lever, means to rotate said lever, means to adjust the speed of said rotation, and a first switch controlling the source of light on the enlarger, said switch adapted to be actuated by said pivoted lever at the end of its travel, whereby said source of light is shut off, said means to control the contrast of the print comprising means to change the color of the light to which the print is exposed, electromagnetic means to actuate said color changing means, and a second switch controlling said electromagnetic means, said second switch in operative relationship with said pivoted lever and adapted to be actuated by said lever during its rotation, including means to adjust the position of said second switch relative to said lever, whereby said switch may be actuated sooner or later during the rotary travel of said lever.

21. A print control instrument according to claim 1, said first part comprising two time measuring devices, adapted to measure, respectively, the charging time of said condenser when said cell is placed on the point of brightest and darkest light intensity on said easel, each comprising a constant speed motor, an electromagnetic clutch, an output shaft, means to keep said clutch deenergized before the measuring process, and means to energize said clutch during and deenergize it at the end of the measuring process, said second part comprising a time switch including a pivoted lever, means to rotate said lever, means to adjust the speed of said rotation, and a switch controlling the source of light on the enlarger, said switch adapted to be actuated by said pivoted lever at the end of its travel, and said third part comprising means operatively connecting the output shaft of one of the motors of said two time measuring devices of the first part to said means to adjust the speed of rotation of said pivoted lever of the time switch of the second part.

22. A print control instrument according to claim 1, said first part including two time measuring devices, the first device adapted to measure the charging time of said condenser when said cell is placed on the brightest point on said easel, and the second device adapted to measure the charging time of said condenser when said cell is placed on the darkest point, each comprising a constant speed motor, an electromagnetic clutch, an output shaft, means to keep said clutch deenergized before the measuring process, and means to energize said clutch during and deenergize it at the end of the measuring process, said second part including a time switch including a pivoted lever, means to rotate said lever including an electric motor, a shaft of polygonal cross-section driven by said motor through a train of gears, a first cam of spiral shaped configuration driving said lever and having a hub with a correspondingly polygonal hole mounted slidably on said shaft, means to adjust the speed of rotation of said lever by sliding said cam on said shaft, and a switch controlling the source of light of the enlarger, said switch adapted to be actuated by said lever at the end of its travel, and said third part including a second cam, driven by the output shaft of the motor of the first time measuring device of the first part, and a two armed pivoted lever, one arm in operative contact with said second cam and adapted to follow its configuration, and the other arm in operative contact with said first cam of said time switch of the second part, and adapted to slide said first cam on said polygonal shaft, thereby automatically adjusting said time switch to the correct exposure time.

23. A print control instrument according to claim 1, said first part including two time measuring devices, the first device adapted to measure the charging time of said condenser when said cell is placed on the brightest point on said easel, and the second device adapted to measure the charging time of said condenser when said cell is placed on the darkest point, each comprising a constant speed motor, an electromagnetic clutch, an output shaft, means to keep said clutch deenergized before the measuring process, and means to energize said clutch during and deenergize it at the end of the measuring process, and said third part comprising means operatively associated with the output shaft of said first measuring device converting its travel into a movement proportional to the logarithmic value of the light intensity of the brightest point on the easel comprising a first cam driven by said output shaft and a first cam following roller, means operatively associated with the output shaft of said second measuring device converting its travel into a movement proportional to the logarithmic value of the light intensity of the darkest point on the easel comprising a second cam driven by said output shaft and a second cam following roller, and mechanism indicating the difference of said two logarithmic light intensities comprising a first pivoted lever with a stationary pivot, a second pivoted lever carrying said two cam following rollers, the pivot of said second lever supported by said first lever and located between the centers of said rollers on a straight line connecting said centers, whereby an equal change of the two light intensities merely causes a rotation of said second lever without moving said first lever, but whereby an unequal change of said two light intensities causes said second lever to assume a new position in accordance with the contrast between the brightest and the darkest point on the easel.

24. A print control instrument according to claim 1, said first part including two time measuring devices, the first device adapted to measure the charging time of said condenser when said cell is placed on the brightest point on said easel, and the second device adapted to measure the charging time of said condenser when said cell is placed on the darkest point, each comprising a constant speed motor, an electromagnetic clutch, an output shaft, and means to energize said clutch during the measuring process, said second part comprising a time switch including a first pivoted lever, means to rotate said lever, means to adjust the speed of said rotation, and a first switch controlling the source of light of the enlarger, said switch adapted to be actuated by said first pivoted lever at the end of its travel, means to control the contrast of the print comprising means to change the color of the light to which the print is exposed, electromagnetic means to actuate said color changing means, and a second switch controlling said electromagnetic means, said second switch in operative relationship with said first pivoted lever and adapted to be actuated by said lever during its rotation, including means to adjust the position of said second switch relative to said lever, whereby said switch may be actuated sooner or later during the rotary travel of said lever, and said third part comprising means operatively associated with the output shaft of said first measuring device converting its travel into a movement proportional to the logarithmic value of the light intensity of the brightest point on the easel comprising a first cam driven by said output shaft and a first cam following roller, means operatively associated with the output shaft of said second measuring device converting its travel into a movement proportional to the logarithmic value of the light intensity of the darkest point on the easel comprising a second cam driven by said output shaft and a second cam following roller, and mechanism indicating the difference of said two logarithmic light intensities comprising a second pivoted lever with a stationary pivot, a third pivoted lever carrying said two cam following rollers, the pivot of said second lever supported by said first lever and located between the centers of said rollers on a straight line connecting said centers, a third cam carried by said second lever, and means operatively connecting said third cam to said means to adjust the second switch of the contrast control means of the second part.

ALFRED SIMMON.
LOUIS L. WEISGLASS.

REFERENCES CITED

The following references are of record in the file of this patent:

UNITED STATES PATENTS

| Number | Name | Date |
|---|---|---|
| 2,353,218 | Burnham | July 11, 1944 |
| 2,258,994 | Merriman | Oct. 14, 1944 |